United States Patent
Wang et al.

(10) Patent No.: US 8,134,774 B2
(45) Date of Patent: Mar. 13, 2012

(54) DYNAMICALLY RECONFIGURABLE NEGATIVE INDEX MATERIAL CROSSBARS WITH GAIN

(76) Inventors: Shih-Yuan Wang, Palo Alto, CA (US);
Jingling Li, Sunnyvale, CA (US);
Alexandre M. Bratkovski, Mountain View, CA (US); Lars Helge Thulen, Huddinge (SE); Wei Wu, Palo Alto, CA (US)

( * ) Notice: Subject to any disclaimer, the term of this patent is extended or adjusted under 35 U.S.C. 154(b) by 477 days.

(21) Appl. No.: 12/386,295

(22) Filed: Apr. 16, 2009

(65) Prior Publication Data

US 2010/0265552 A1 Oct. 21, 2010

(51) Int. Cl.
*H01S 3/00* (2006.01)
(52) U.S. Cl. .......................... 359/333; 977/762
(58) Field of Classification Search ........... 359/333, 359/341.3–341.33; 372/69–91
See application file for complete search history.

(56) References Cited

U.S. PATENT DOCUMENTS

| 2005/0017370 | A1* | 1/2005 | Stasiak | 257/777 |
| 2008/0239462 | A1* | 10/2008 | Kuekes et al. | 359/299 |
| 2010/0165431 | A1* | 7/2010 | Li et al. | 359/32 |

FOREIGN PATENT DOCUMENTS

WO WO 2006096762 A1 * 9/2006

\* cited by examiner

*Primary Examiner* — Stephone Allen
*Assistant Examiner* — Kimberly N Kakalec

(57) ABSTRACT

Various embodiments of the present invention are directed to negative index material crossbars that can be electronically controlled and dynamically reconfigured to exhibit a variety of electromagnetic properties. In one aspect, a negative index material crossbar comprises a first layer of non-crossing nanowires, and a second layer of approximately parallel nanowires that overlay the nanowires in the first layer. Resonant elements at nanowire intersections, and a gain material incorporated in the crossbar such that transmitted electromagnetic radiation with wavelengths in a wavelength band of interest is enhanced when the crossbar is flood pumped with pump electromagnetic radiation.

20 Claims, 27 Drawing Sheets

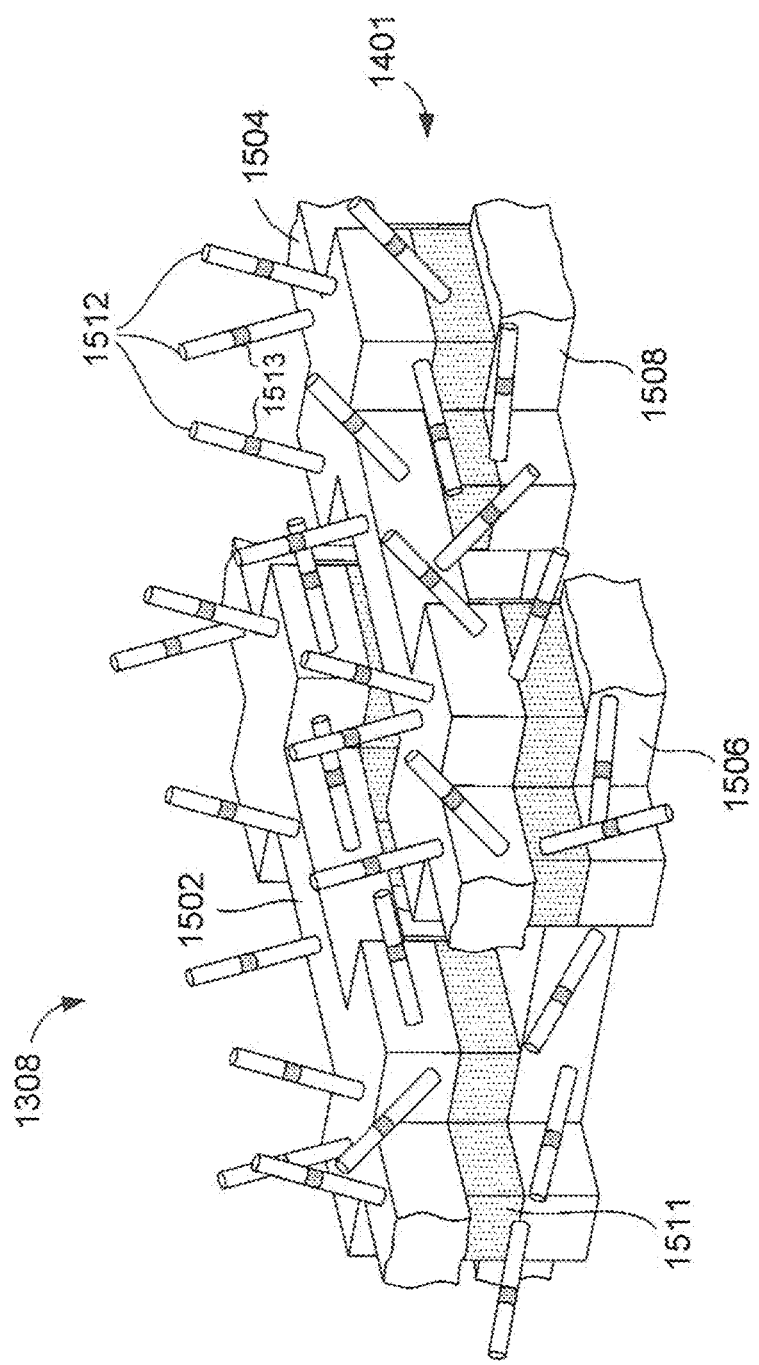

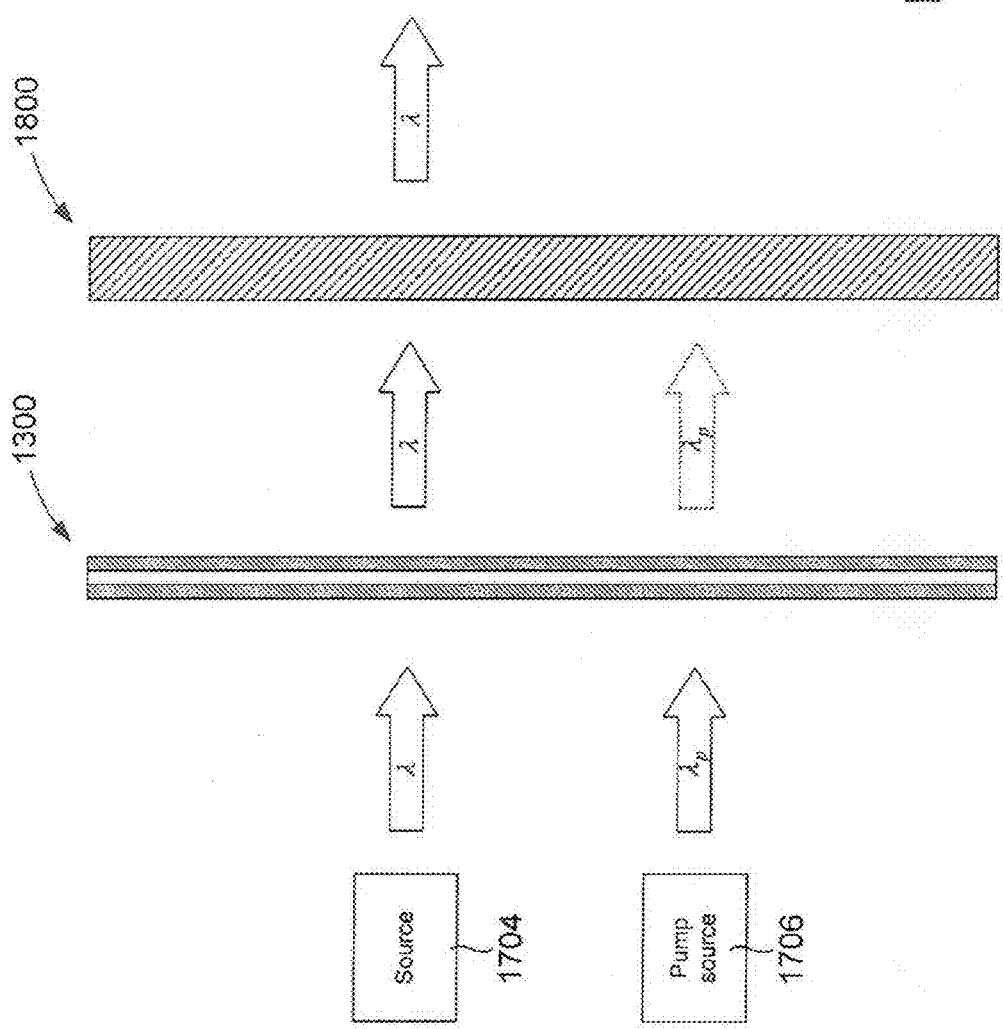

DYNAMICALLY RECONFIGURABLE NEGATIVE INDEX MATERIAL CROSSBARS WITH GAIN

GOVERNMENT FUNDING

This invention was made with government support under DARPA contract number HR0011-05-3-0002. The U.S. government may have certain rights in this invention.

TECHNICAL FIELD

Embodiments of the present invention relate to negative index materials, and, in particular, to dynamically reconfigurable negative index materials configured to include gain.

BACKGROUND

Many different kinds of materials interact with light and other electromagnetic fields. These materials can be configured to control light in various ways, forming the basis for optical devices, such as lenses and prisms. The optical properties of a typical optical device are related to how the device is configured and on the material of which the device is composed. A typical lens, for example, can be composed glass or plastic and can be configured to bend an incident beam of light to either converge or diverge. Optical fibers and waveguides are examples of other types of optical devices formed by stretching various combinations of glasses or plastics to guide light over large distances.

The quality and diversity of typical optical devices is, at least in part, limited by the available range of electromagnetic properties of the materials comprising the optical devices. As a result, existing materials exhibit only a fraction of the electromagnetic properties that are theoretically available. One way to expand the available range of optical device properties is by adjusting the composition of the optical device materials at the molecular level. Another way is to broaden the definition of a material to include artificially structured materials in which the electromagnetic response results from a macroscopic patterning or arrangement of two or more distinct materials.

In recent years, there has been an increasing interest in artificially structured materials that expand the range of electromagnetic properties beyond the inherent properties of typical materials used to produce optical devices. Artificially structured materials with designed inclusions can exhibit exotic and unique electromagnetic interactions with particular portions of the electromagnetic spectrum not inherent in the individual constituent materials. These artificially structured materials, called negative index materials ("NIMs"), have the potential to fill critical voids in interacting with the electromagnetic spectrum where typical material response is limited and, therefore, enable the construction of novel devices. In particular, NIMs can be configured to exhibit a negative refractive index for particular portions of the electromagnetic spectrum, a property not found in devices composed of typical materials, have drawn significant interest, underscoring the potential of NIMs to facilitate new developments in controlling electromagnet radiation.

BRIEF DESCRIPTION OF THE DRAWINGS

FIGS. 15A-15G show ways in which gain material is incorporated into the negative index material crossbar shown in FIG. 13 in accordance with embodiments of the present invention.

FIG. 18A shows a schematic representation of a filter positioned and operated in accordance with embodiments of the present invention.

DETAILED DESCRIPTION

Figure 1A:
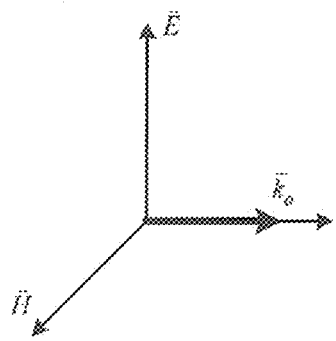
FIG. 1A-1B show wave and Poynting vector directions for electromagnetic waves propagating in an ordinary right-handed medium.

Various embodiments of the present invention are directed to negative index material ("NIM") crossbars that can be electronically controlled and dynamically reconfigured to exhibit a variety of electromagnetic properties. A NIM crossbar configured in accordance with embodiments of the present invention can be operated as an electronically reconfigurable hologram, lens, prism, NIM, or a variety of other devices. For example, the same NIM crossbar can be operated to control wavefronts in an electronically reconfigurable hologram in one instance and electronically reconfigured to operate as a lens or a prism in another. However, NIM crossbars may cause loss of transmitted electromagnetic radiation. In order to compensate for the loss, NIM crossbars configured in accordance with embodiments of the present invention include electromagnetic radiation gain materials. In order to control gain at each crossbar junction, the gain material is selected and flood pumped to emit electromagnetic radiation with substantially the same wavelength as the radiation transmitted through the NIM crossbar. Each crossbar junction is electronically controlled to vary resonance with the electromagnetic radiation. This hybrid approach of pumping the gain material and electronic control of the resonant characteristics of crossbar junctions allows both gain and crossbar junction control of gain and loss of NIM crossbars.

Negative Index Materials

Negative index materials ("NIMs"), also called metamaterials, are materials with optical properties resulting from the structure of the material rather than from the chemical composition of the material. Natural materials have positive permeability, $\mu$, and may have positive or negative dielectric permittivity $\epsilon$, depending on the type of conductivity of the material and frequency ranges. In contrast, NIMs have simultaneously negative $\epsilon$ and $\mu$ for certain portions of the electromagnetic spectrum, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, consider Maxwell's first-order differential equations for an electromagnetic wave propagating in an ordinary composite material with a time harmonic field as follows:

$$\nabla \times \vec{E} = -j\omega\mu\vec{H}$$

$$\nabla \times \vec{H} = j\omega\epsilon\vec{E}$$

where $\vec{E}$ is the electric field component, $\vec{H}$ is the magnetic field component, $j=\sqrt{-1}$, and $\omega$ is the angular frequency. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 1B:
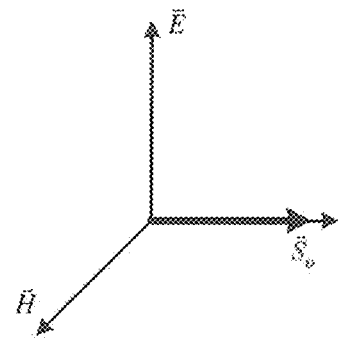
Figure 2A:
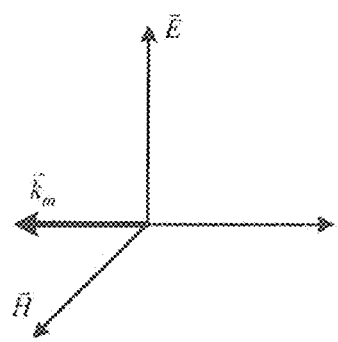
FIGS. 2A-2B show wave and Poynting vector directions for electromagnetic waves propagating in a negative index metamaterial.
Figure 2B:
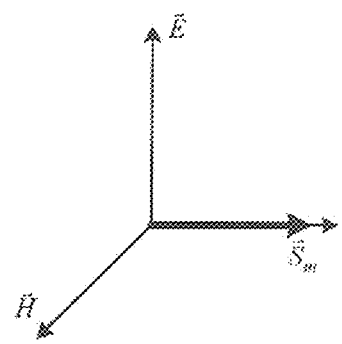

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega\epsilon\vec{E}$$

where $\vec{k}_o$ is a wavevector indicating the direction an electromagnetic wave propagates within a composite material. FIG. 1A shows the spatial relationship and relative orientation of the vectors $\vec{E}$, $\vec{H}$, and $\vec{k}_o$ and reveals that for an ordinary composite material with positive $\epsilon$ and $\mu$, the vectors $\vec{E}$, $\vec{H}$, and $\vec{k}_o$ form an orthogonal, right-handed system of vectors. In addition, the direction of the time-averaged energy flux of the electromagnetic wave is given by the real component of the Poynting vector:

$$\vec{S}_o = \frac{1}{2} \text{Re}(\vec{E} \times \vec{H}^*)$$

which, as shown in FIG. 1B, reveals that the vectors $\vec{E}$, $\vec{H}$, and $\vec{S}_o$, also form an orthogonal, right-handed vector system. In other words, FIGS. 2A and 2B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

On the other hand, consider NIMs, where $\epsilon<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\epsilon|\vec{E}$$

where $\vec{k}_m$ is a wavevector indicating the direction the phase the electromagnetic wave propagates in a NIM. As shown in FIG. 2A, and in contrast to the composite materials shown in FIG. 1A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 1A and 2A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 2B, the Poynting vector $\vec{S}_m$ in a metamaterial is unaffected by the change of sign of $\epsilon$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1 > 0$, from Snell's law it follows that $n_2 < 0$. That is, the sign of the square root in the definition of the refractive index is chosen to be negative:

$$n_2 = -\sqrt{\epsilon\mu} < 0$$

Hence the term "negative index material" is used to refer to materials having both negative $\epsilon$ and $\mu$.

Figure 3:
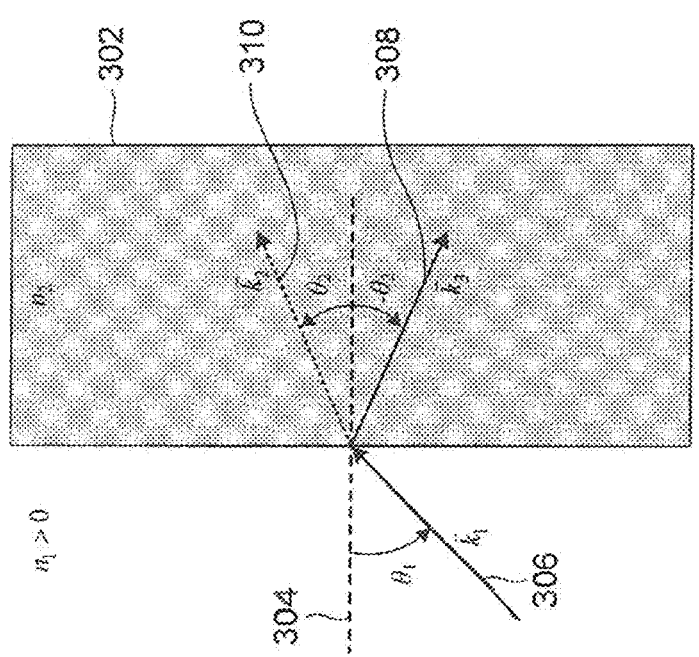
FIG. 3 shows refraction of rays of electromagnetic radiation in an ordinary right-handed medium and a negative index metamaterial.

FIG. 3 shows refraction of rays of electromagnetic radiation in an ordinary right-handed medium and a negative index metamaterial. Dashed line 304 represents a surface normal extending perpendicular to the surface of a medium 302. As shown in FIG. 3, angle $\theta_1$ and wavevector $\vec{k}_1$ 306 represent the angle-of-incidence and direction of a ray of electromagnetic radiation propagating through an ordinary medium with index of refraction $n_1 > 0$ and is incident on the medium 302. Angle $-\theta_2$ and wavevector $\vec{k}_3$ 308 represent the angle-of-refraction and direction of a refracted ray of electromagnetic radiation propagating within the medium 302 with refractive index $n_2 < 0$, while angle $\theta_2$ and wavevector $\vec{k}_2$ 310 represent the angle-of-refraction and direction of a refracted ray of electromagnetic radiation propagating within the medium 302 with refractive index $n_2 > 0$, where $|n_2| > n_1$. Thus, for the medium 302 with a refractive index of $n_2 < 0$, the incident ray 306 and the refracted ray 308 lie on the same side of the surface normal 304, and for the medium 302 with a refractive index of $n_2 > 0$, the incident ray 306 and the refracted ray 310 lie on opposite sides of the surface normal 304.

Figure 4:
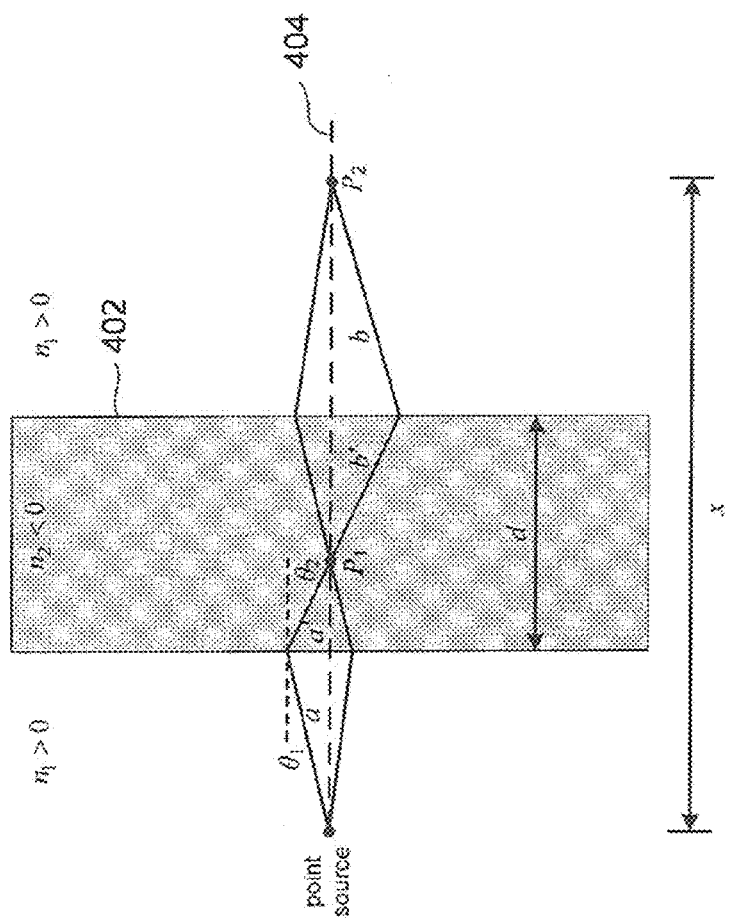
FIG. 4 shows focusing properties of a metamaterial slab for electromagnetic radiation emanating from a point source.

Tracing the paths of optical rays through conventional concave and convex lens made of left-handed media reveals that concave lenses become convergent and convex lens become divergent, thus reversing the behavior of lenses comprising ordinary media. FIG. 4 shows focusing properties of a slab 402 composed of a NIM for electromagnetic radiation emanating from a point source. For incident rays paraxial to an optical axis 404, Snell's law gives:

$$|n| = \frac{|n_2|}{n_1} = \frac{|\sin\theta_1|}{|\sin\theta_2|} \Box \frac{|\tan\theta_1|}{|\tan\theta_2|} = \frac{a'}{a} = \frac{b'}{b}$$

where n is the refractive index $n_2$ of the slab 402 relative to refractive index of the surrounding medium $n_1$. As shown in FIG. 4, rays emanating from the point source are focused at two points $P_1$ and $P_2$. Point $P_1$ lies inside the slab 402 and point $P_2$ lies on the side of the slab 402 opposite the point source. The distance from the point source to the second focusing point $P_2$ is given by:

$$x = a + a' + b' + b = d + \frac{d}{|n|}$$

where d is the width of the slab. When n equals −1, the focusing effect is not restricted to paraxial rays, because in this case $|\theta_1|$ equals $|\theta_2|$ for any angle-of-incidence. In fact, when n equals −1, all rays emanating from the point source are focused at two points, the latter point $P_2$ being at a distance $2d$ from the point source. Thus, unlike slabs comprising ordinary composite materials, slabs composed of NIMs can be configured to focus electromagnetic radiation.

Negative Index Material Crossbars

Figure 5:
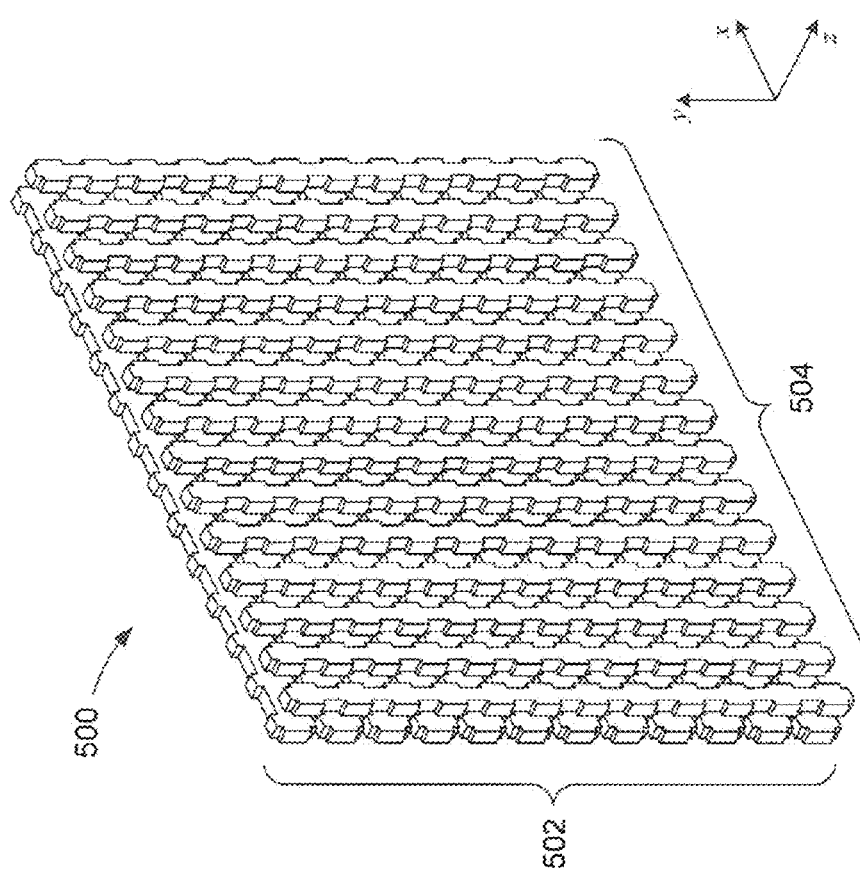
FIG. 5 shows an isometric view of a negative index material crossbar configured in accordance with embodiments of the present invention.

FIG. 5 shows an isometric view of a NIM crossbar 500 configured in accordance with embodiments of the present invention. The NIM crossbar 500 comprises a first layer of non-crossing, approximately parallel nanowires 502 that are overlain by a second layer of non-crossing, approximately parallel nanowires 504. The nanowires of the first layer 502 run substantially parallel to the x-axis and are approximately perpendicular, in orientation, to the nanowires of the second layer 504, which run substantially parallel to the y-axis, although the orientation angle between the nanowires of the layers 502 and 504 may vary. The two layers of nanowires form a lattice, or crossbar, with each nanowire of the second layer 504 overlying all of the nanowires of the first layer 502 and coming into close contact with each nanowire of the first layer 502 at nanowire intersections called "resonant elements" that represent the closest contact between two nanowires.

Figure 6:
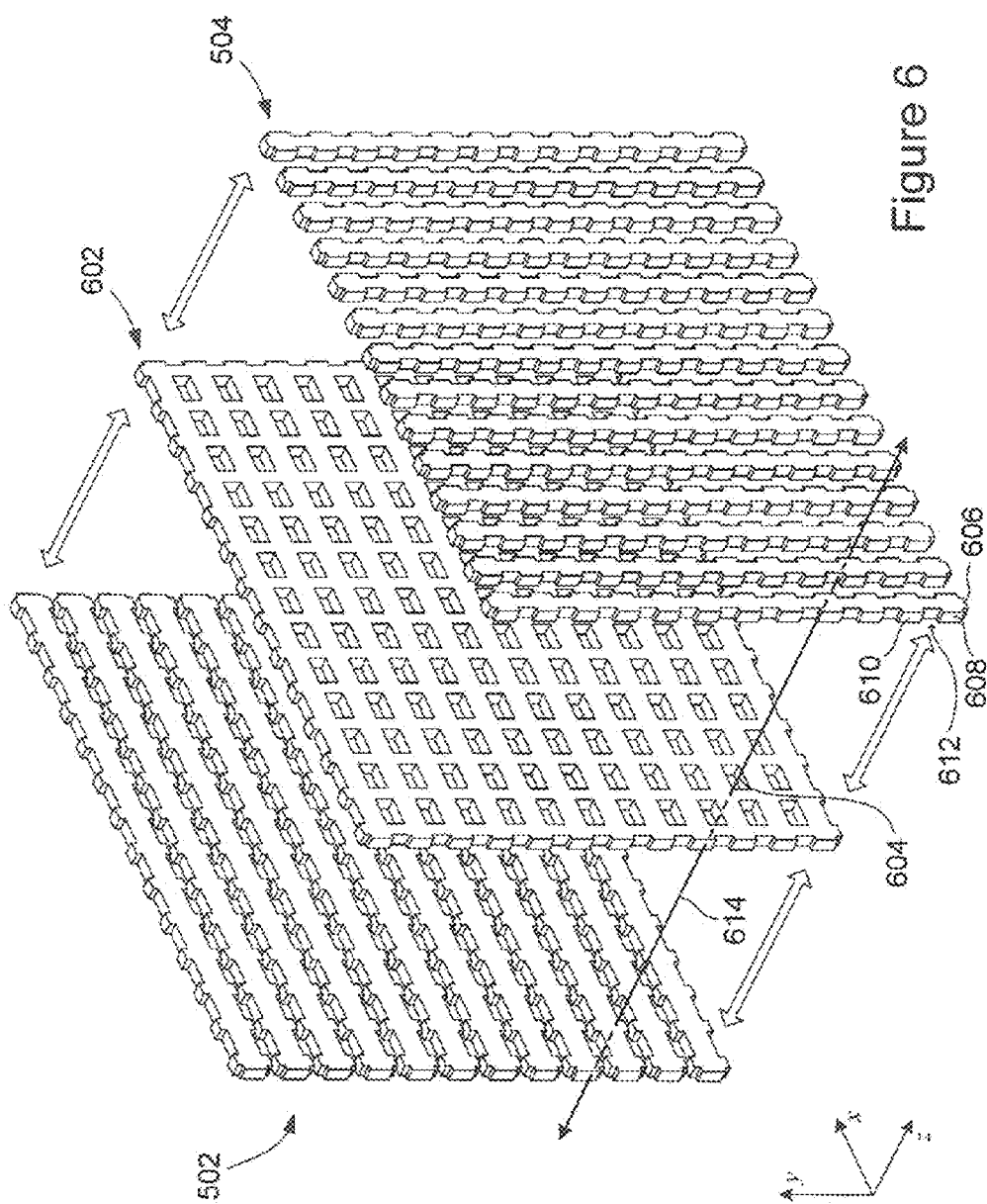
FIG. 6 shows an exploded isometric view of the negative index material crossbar configured in accordance with embodiments of the present invention.

FIG. 6 shows an exploded isometric view of the NIM crossbar 500 configured in accordance with embodiments of the present invention. FIG. 6 reveals an intermediate layer 602 sandwiched between the first layer of nanowires 502 and the second layer of nanowires 504. The intermediate layer 602 is a continuous layer including an array of regularly spaced holes, such as hole 604. In certain embodiments, as shown in FIG. 6, the holes can be rectangular, and in other embodiments, the holes can be square. The nanowires in the first layer 502 have relatively larger cross-sectional dimensions than the nanowires comprising the second layer 504. FIG. 6 also reveals that the nanowires in both the first and second layers 502 and 504 are configured with substantially regularly spaced protuberances called "fingers" that are separated by notches. For example, nanowire 606 includes fingers 608 and 610 separated by a notch 612. The fingers of nanowires of one layer are approximately parallel to the length of the nanowires in the other layer, and the fingers of adjacent nanowires within the same layer are also substantially aligned within the first and second layers 502 and 504, and the holes in the intermediate layer 602 are substantially aligned with the notches between fingers in the first and second layers 502 and 504. For example, line 614 passes through notches of adjacent nanowires in the first layer 502 passes through the hole 604 in the intermediate layer 602 and passes through notches in adjacent nanowires in the second layer 504.

Figure 7:
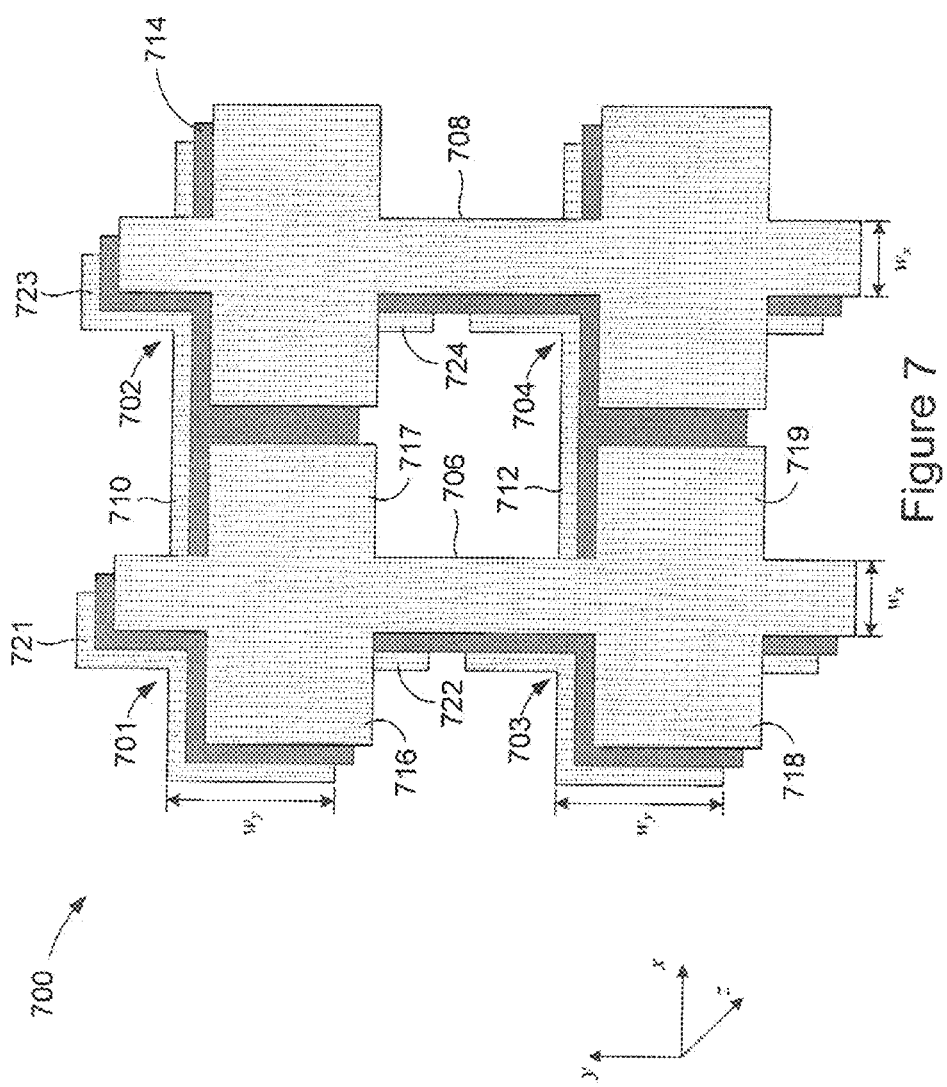
FIG. 7 shows an isometric view of an enlargement of a four adjacent resonant elements of the negative index material crossbar configured in accordance with embodiments of the present invention.

FIG. 7 shows an isometric view of an enlargement 700 of a four adjacent resonant elements 701-704 of the NIM crossbar 500 configured in accordance with embodiments of the present invention. The resonant elements 701-704 are formed by nanowires 706 and 708 extending in the y-direction overlaying portions of nanowires 710 and 712 extending in the x-direction. The nanowires 706 and 708 are separated from the nanowires 710 and 712 by a portion 714 of intermediate layer 602. The width $w_x$ of the nanowires 710 and 712 in the first layer 502 is larger than the width $w_y$ of the nanowires 706 and 708 in the second layer 504. The nanowires 706 and 708 include fingers protruding in the x-direction, such as fingers 716-719 of nanowire 706, and nanowires 710 and 712 include fingers protruding in the y-direction, such as fingers 721-724 of nanowire 710. The fingers of adjacent nanowires lying in the same layer are separated by gaps. As shown in FIG. 7, each of the resonant elements 701-704 includes two fingers of a nanowire in the first layer 502 and two fingers of a nanowire in the second layer 504. For example, resonant element 701 includes fingers 716 and 717 of nanowire 706 and fingers 721 and 722 of nanowire 710.

Figure 8:
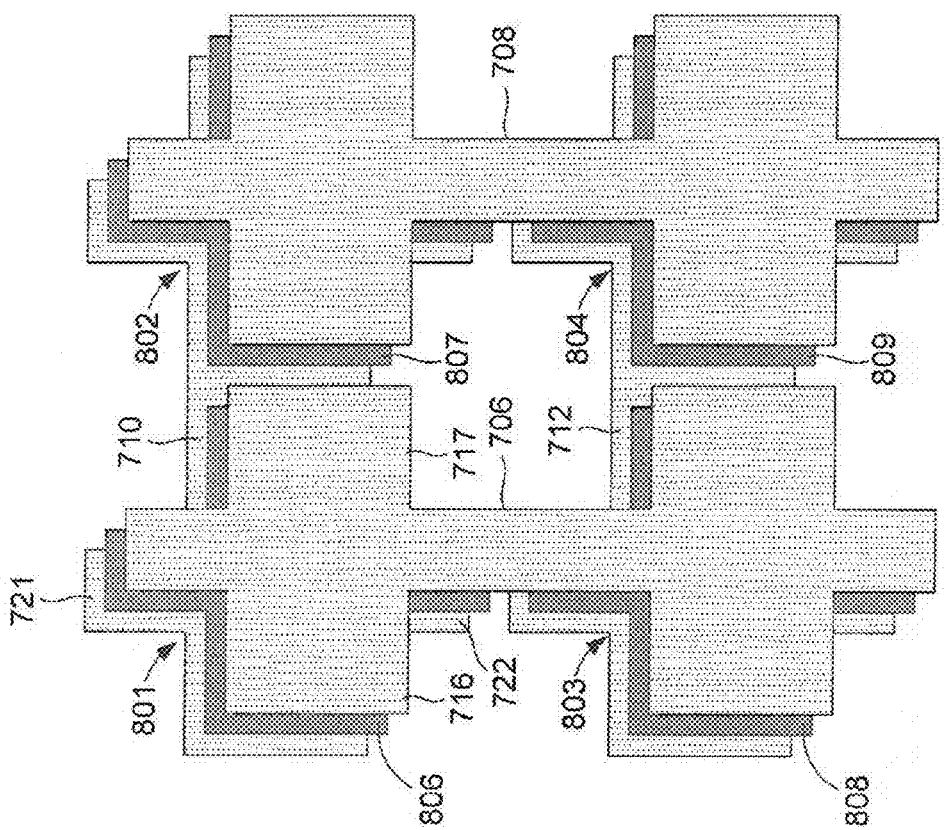
FIG. 8 shows an isometric view of an enlargement of four adjacent resonant elements of a negative index material crossbar configured in accordance with embodiments of the present invention.

In other embodiments, the intermediate layer 602 may be composed of discrete portions of a material lying within each resonant element. FIG. 8 shows an isometric view of an enlargement 800 of four adjacent resonant elements 801-804 of a NIM crossbar configured in accordance with embodiments of the present invention. The resonant elements 801-804 include intermediate plus-shaped layers 806-809, respectively, disposed within the region between the fingers of nanowires 706 and 708 overlaying nanowires 710 and 712. As shown in FIG. 8, adjacent plus-shaped layers 806-809 are separated by gaps, and each plus-shaped layer fills the space between the nanowire of one layer and the fingers of a nanowire in another layer. For example, plus-shaped layer 806 is configured to fill the space between fingers 721 and 722 and nanowire 706 and fill the space between fingers 716 and 717 and nanowire 710.

Although individual nanowires shown in FIG. 5-8 have rectangular cross sections, nanowires can also have square, circular, elliptical, or more complex cross sections dictated by design of supporting a magneto-plasmon resonance and related NIM behavior over a particular wavelength or frequency range of interest of the electromagnetic spectrum. The nanowires may be configured to have many different widths or diameters and aspect ratios or eccentricities ranging from approximately ⅕ to approximately 1/20 of the wavelength of incident electromagnetic radiation or ranging from approximately 20 nm to approximately 200 nm. Although the fingers shown in FIGS. 5-8 have clearly defined edges, in other embodiments, the fingers may have rounded edges. The term "resonant element" may refer to crossbars having one or more layers of sub-microscale wires, microscale wires, or wires with larger cross-sectional dimensions, in addition to nanowires. The nanowires can be comprised of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident electromagnetic radiation.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 5-8, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The resonant elements can be configured with dimensions that are smaller than the wavelength λ of electromagnetic radiation incident on the crossbar 500 enabling the crossbar 500 to be operated as a NIM over particular wavelength ranges of interest. In particular, the size and shape of the fingers can be selected to have an appropriate inductance, resistance, and capacitance response to a wavelength of interest. In addition, because each resonant element can be separately addressed by biasing the pair of nanowires crossing at the selected resonant element, the refractive index of the intermediate layer of each resonant element can be adjusted by applying appropriate electronic signals, such as voltages or currents, to the nanowires. The size and shape of the fingers and control over the refractive index of the intermediate layer of the resonant elements enables the crossbar 500 to be configured and operated as a NIM over particular wavelength ranges of interest and shift the transmission phase of electromagnetic radiation transmitted through the crossbar 500.

Figure 9:
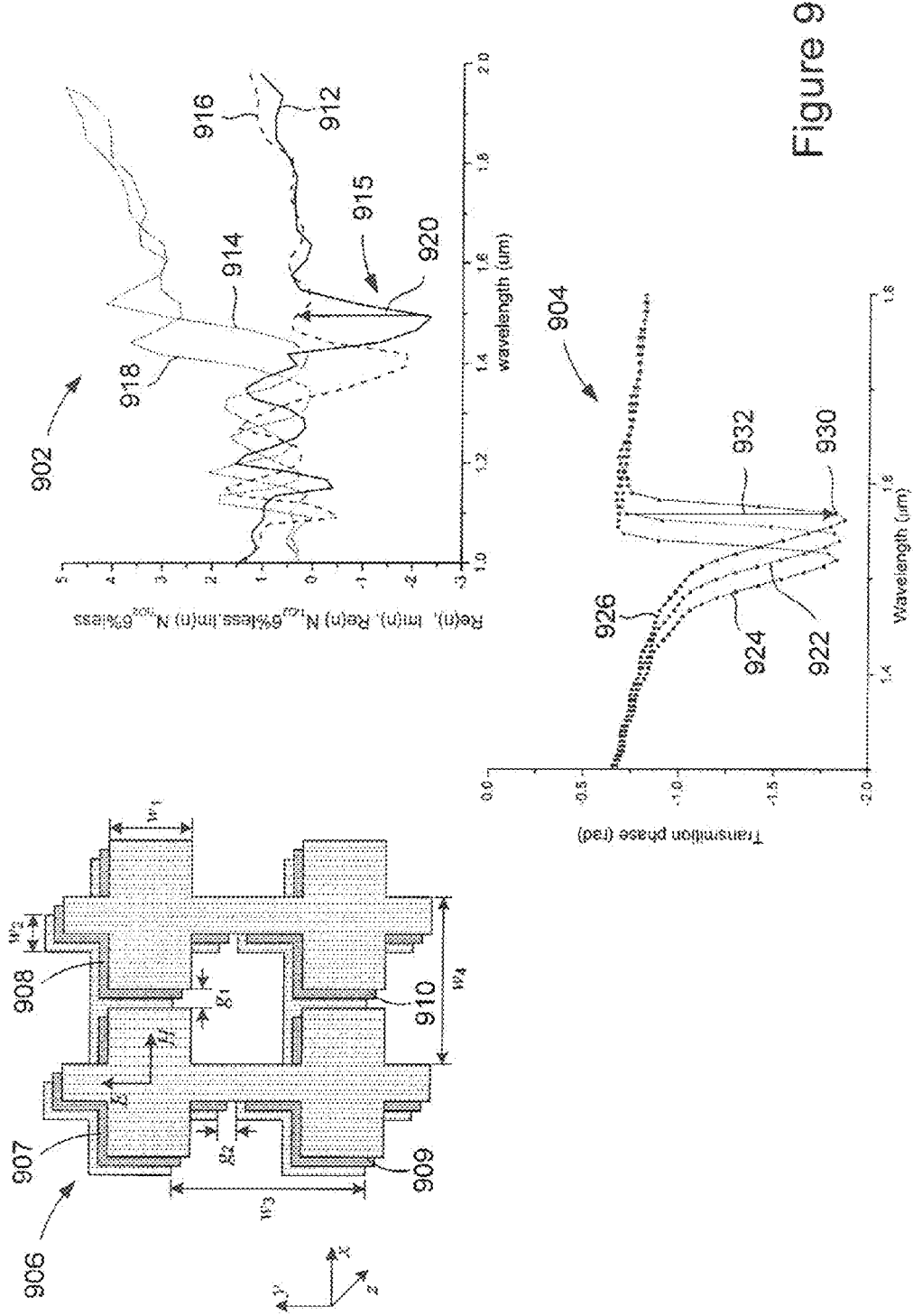
FIG. 9 shows a plot of the refractive index and phase changes for an exemplary negative index material crossbar configured and operated in accordance with embodiments of the present invention.

FIG. 9 shows a plot of the refractive index 902 and phase changes 904 for an exemplary NIM crossbar configured and operated in accordance with embodiments of the present invention. Plots 902 and 904 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 9 also includes a crossbar 906 representing four adjacent resonant elements with parameters identifying the dimensions of the nanowires, fingers, and spacing between resonant elements used to obtain the results displayed in plots 902 and 904. The dimensions of the parameters are provided in Table I as follows:

TABLE I

| Parameter | Dimension |
| --- | --- |
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 907-910 are composed of $TiO_2$ with a thickness of 60 nm.

For electromagnetic radiation polarized in the y-direction and incident on the crossbar 906 in the z-direction, curves 912 and 914 of plot 902 represent the real and imaginary refractive index components, respectively, over a range of wavelengths with no electronic signal applied to resonant elements of the crossbar 906. A portion 915 of the real component 912 indicates that the crossbar 906 exhibits a negative refractive index for incident electromagnetic radiation with wavelengths ranging from approximately 1.42 μm to approximately 1.55 μm with the largest negative refractive index occurring for incident electromagnetic radiation with wavelengths of approximately 1.5 μm. Curves 916 and 918 of plot 902 represent the real and imaginary refractive index components with a 6% change in the refractive index when appropriate electronic signals are applied to the nanowires of the crossbar 906. Curve 916 exhibits a real negative refractive index shift for incident electromagnetic radiation with wavelengths ranging from approximately 1.32 μm to approximately 1.46 μm with the largest negative refractive index occurring for incident electromagnetic radiation with wavelengths of approximately 1.4 μm. In other words, the crossbar 906 can be operated to change the refractive index that incident electromagnetic radiation encounters over particular wavelength ranges. For example, incident electromagnetic radiation with a wavelength of interest, such as a wavelength of approximately 1.5 μm, encounters the strongest real negative refractive index component when no electronic signal is applied to the crossbar 906. However, when appropriate electronic signals are applied to the nanowires, the refractive index encountered by the wavelength of interest is shifted to a positive relatively smaller in magnitude refractive index, as indicated by directional arrow 920.

A change in the refractive index encountered by the wavelength of interest shifts the transmission phase of the wavelength of interest. Curves 922-924 of plot 904 represent the transmission phase of electromagnetic radiation over a range of wavelengths passing through the crossbar 906 for three different refractive indices. Curve 922 represents the transmission phase acquired by electromagnetic radiation over a range of wavelengths passing through the crossbar 906 when no electronic signal is applied to the crossbar 906. Curve 924 represents the transmission phase acquired by electromagnetic radiation over a range of wavelengths passing through the crossbar 906 when electronic signals applied to the nanowires of the crossbar 906 increase the refractive index of the intermediate layers 907-910 by 3%. Curve 926 represents the transmission phase acquired by electromagnetic radiation over a range of wavelengths passing through the crossbar 906 when electronic signals applied to the nanowires of the crossbar 906 decrease the refractive index of the intermediate layers 907-910 by 3%. The crossbar 906 can be operated to shift the phase acquired by a wavelength of interest. The transmission phase is the phase acquired by electromagnetic radiation transmitted through the crossbar 906. For example, when no electronic signal is applied to the crossbar 906, point 928 indicates that electromagnetic radiation with the wavelength interest, approximately 1.58 μm, transmitted through the crossbar 906 acquires a transmission phase of approximately −0.7 radians. On the other hand, when electronic signals corresponding to the curve 926 are applied to the crossbar 906, the wavelength of interest acquires a transmission phase of approximately −1.78 radians, which is a transmission phase shift of approximately −1.2 radians from the point 928 to the point 930, as indicated by directional arrow 932.

Resonant Elements

The refractive index of the materials selected for the intermediate layer of the resonant elements can vary according to the particular molecular configuration or electronic states of the material. The materials selected for the resonant elements exhibit an appreciable refractive index change in response to externally applied electric fields, which can be used to control the resonant behavior of the phase shift, as described above with reference to FIG. 9. In certain embodiments, the material may transition reversibly from one state to another and back, so that the resonant elements may be reconfigured, or programmed, by application of differential current levels or voltages, called electronic signals, to selected resonant elements. The molecules comprising the intermediate layers of the resonant elements may have various different states in which the molecules exhibit resistive, semiconductor-like, or conductive electrical properties. The states and relative energies of the states of the intermediate layer materials may be controlled by applying differential current levels or voltages to the overlapping nanowires forming the resonant element. For example, in certain embodiments, certain states of the intermediate layer materials can be set by applying electronic signals to nanowires of a resonant element. In certain embodiments, the applied electronic signals can change the oxidation or redox state of the intermediate layer material which induces a change in the refractive index of the resonant element. Additional circuit elements such as diodes, transistors, memristors, capacitors, and resistors for optimal performance can be formed at resonant elements or a part of the nanowire crossbar. A nanowire crossbar can also be integrated with CMOS circuits.

Figure 10:
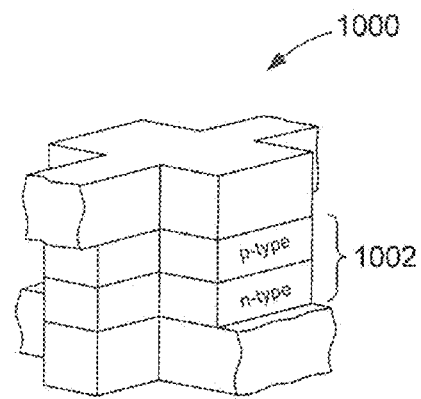
FIG. 10 shows an isometric view a resonant element configured with a p-n junction intermediate layer in accordance with embodiments of the present invention.

In certain embodiments, the refractive index of the resonant elements can be configured and operated as p-n junctions in order to change the refractive index of the resonant elements by carrier injection. FIG. 10 shows an isometric view a resonant element 1000 configured with a p-n junction intermediate layer 1002 in accordance with embodiments of the present invention. The p-n junction 1002 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 10, p-n junction 1002 includes a p-type layer and an n-type layer, where the p-type layer is doped with electron accepting impurities and the n-type layer is doped with electron donating impurities. The impurities also called dopants can be atoms. The dopants can be p-type impurities, which are atoms that introduce vacant electronic energy levels called "holes" to the electronic band gaps of the p-n junction 1002. These impurities are also called "electron acceptors." The dopants can be n-type impurities, which are atoms that introduce filled electronic energy levels to the electronic band gap of the p-n junction 1002. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 1002 can be adjusted by varying the magnitude and type of bias applied to p-n junction 1002. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 1002 returns to an unbiased electronic state. The refractive index of the p-n junction 1002 is different under the forward, reverse, and no bias.

Figure 11:
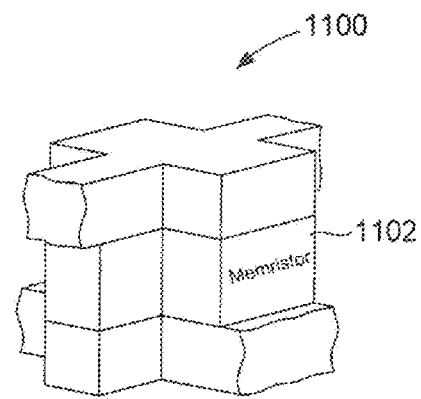
FIG. 11 shows an isometric view a resonant element configured with an intermediate memristors layer in accordance with embodiments of the present invention.

In other embodiments, the resonant elements can be configured as memristors that can change and retain their resistance state even after the bias has been removed. Each resistance state corresponds to a different refractive index. FIG. 11 shows an isometric view a resonant element 1100 configured with an intermediate memristors layer 1102 in accordance with embodiments of the present invention. The memristor layer 1102 includes a primary active region, or layer, and a secondary active region, or layer. The primary active region comprises a thin film of a material that is electronically semiconducting or nominally electronically insulating and can also be a weakly ionic conductor. The primary active material is capable of transporting and hosting ions that act as dopants to control the flow of electrons through the resonator element 1100. The basic mode of operation is to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 1102 can be placed in one of the four different types of rectifying states: a forward rectifier, a reverse rectifier, a head-to-head rectifier, and a shunted rectifier, as shown in FIG. 11. Each of the rectifying states corresponds to a different refractive index.

In addition, the primary active material and the dopants are chosen such that the drift of the dopants into or out of the primary active material is possible but not too facile in order to ensure that the memristor layer 1102 remains in a particular rectifying state for a reasonable period of time, perhaps for many years at room temperature. This ensures that the memristor layer 1102 is nonvolatile. In other words, the memristor layer 1102 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the element to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions of the memristor layer 1102 are contacted on either side by nanowires or one of the nanowires can be composed of a semiconductor material and the other a metal. When the memristor layer 1102 is composed of semiconductor material, the contract between a metal electrode and the memristor layer 1102 depletes the memristor layer 1102 of free charge carriers. Thus, the memristor layer 1102 has a net charge that depends on the identity of the dopant which is positive in the case of electron donors and negative in the case of electron acceptors.

Figure 12:
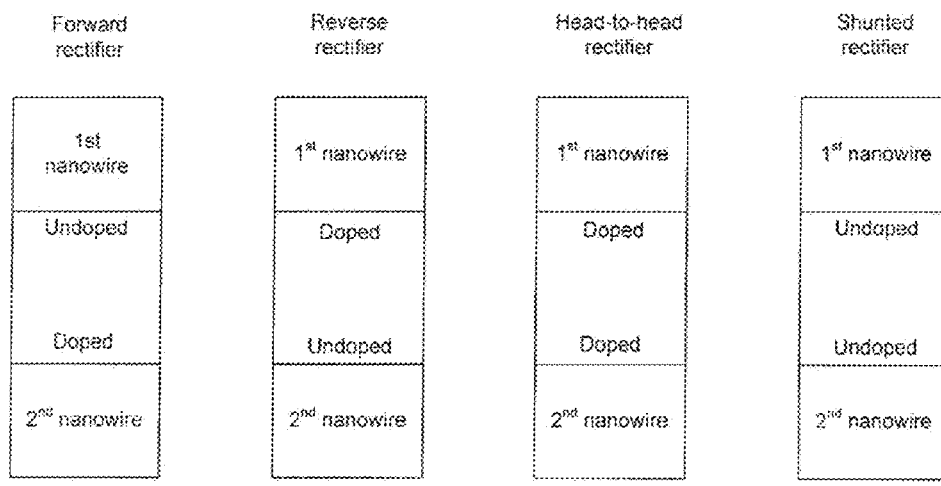
FIG. 12 shows four cross-sectional views of dopant distributions in memristor elements in accordance with embodiments of the present invention.

Switching from one rectifying state to another can be accomplished by applying an electric field of an appropriate magnitude and polarity across the memristor layer 1102. The electric field forces the dopants to drift into or out of the electrode/active region interface regions thus changing the rectifying state of the memristor layer 1102. For example, as shown in FIG. 12, an appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material is substantially improved if one of the interfaces connecting the memristor layer 1102 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the element.

The primary and secondary active materials of the memristor layer 1102 can be oxides, sulfides, selenides, nitrides, phosphides, arsenides, chlorides, hydrides, and bromides of the transition and rare-earth metals, with or without the alkaline earth metals being present. In addition, there are various alloys of these compounds with each other, which can have a wide range of compositions if they are mutually soluble in each other. In addition, the memristor layer 1102 can be composed of mixed compounds, in which there are two or more metal atoms combined with some number of electronegative elements. The dopants can be anion vacancies or different valence elements doped in the memristor layer 1102. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 1102 can be composed of oxides that contain at least one oxygen atom (O) and at least one other element. In particular, the memristor layer 1102 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 1102 include alloys of these oxides in pairs or with all three of the elements Ti, Zr, and Hf present. For example, the memristor layer 1102 can be composed of $Ti_xZr_yHf_zO_2$ where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 1102 can be composed of $ABO_3$, where A represents a divalent element (e.g., $Sr^{++}$, $Ba^{++}$) and B represents $Ti^{4+}$, $Zr^{4+}$, and $Hf^{4+}$. The memristor layer 1102 can also be composed of alloys of these various compounds, such as $Ca_aSr_bBa_cTi_xZr_yHf_zO_3$, where $a+b+c=1$ and $x+y+z=1$. There are also a wide variety of other oxides of the transition and rare earth metals with different valences that may be used, both individually and as more complex compounds. In each case, the mobile dopant can be an oxygen vacancy or an aliovalent element doped into the memristor layer 1102. The oxygen vacancies effectively act as dopants with one shallow and one deep energy level. Because even a relatively minor nonstoichiometry of about 0.1% oxygen vacancies in $TiO_{2-x}$, is approximately equivalent to $10^{20}$ dopants/$cm^3$, modulating oxygen vacancy profiles have strong effect on electron transport.

In other embodiments, the memristor layer 1102 can be a sulfide or a selenide of the transition metals with some ionic bonding character, essentially the sulfide and selenide analogues of the oxides described above.

In other embodiments, the memristor layer 1102 can be a semiconducting nitride or a semiconducting halide. For example, semiconducting nitrides include AlN, GaN, ScN, YN, LaN, rare earth nitrides, and alloys of these compounds and more complex mixed metal nitrides, and semiconducting halides include CuCl, CuBr, and AgCl. The memristor layer 1102 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and $CuO$, exhibit large changes in refractive indices.

Dynamically Reconfigurable NIM Crossbars

Figure 13:
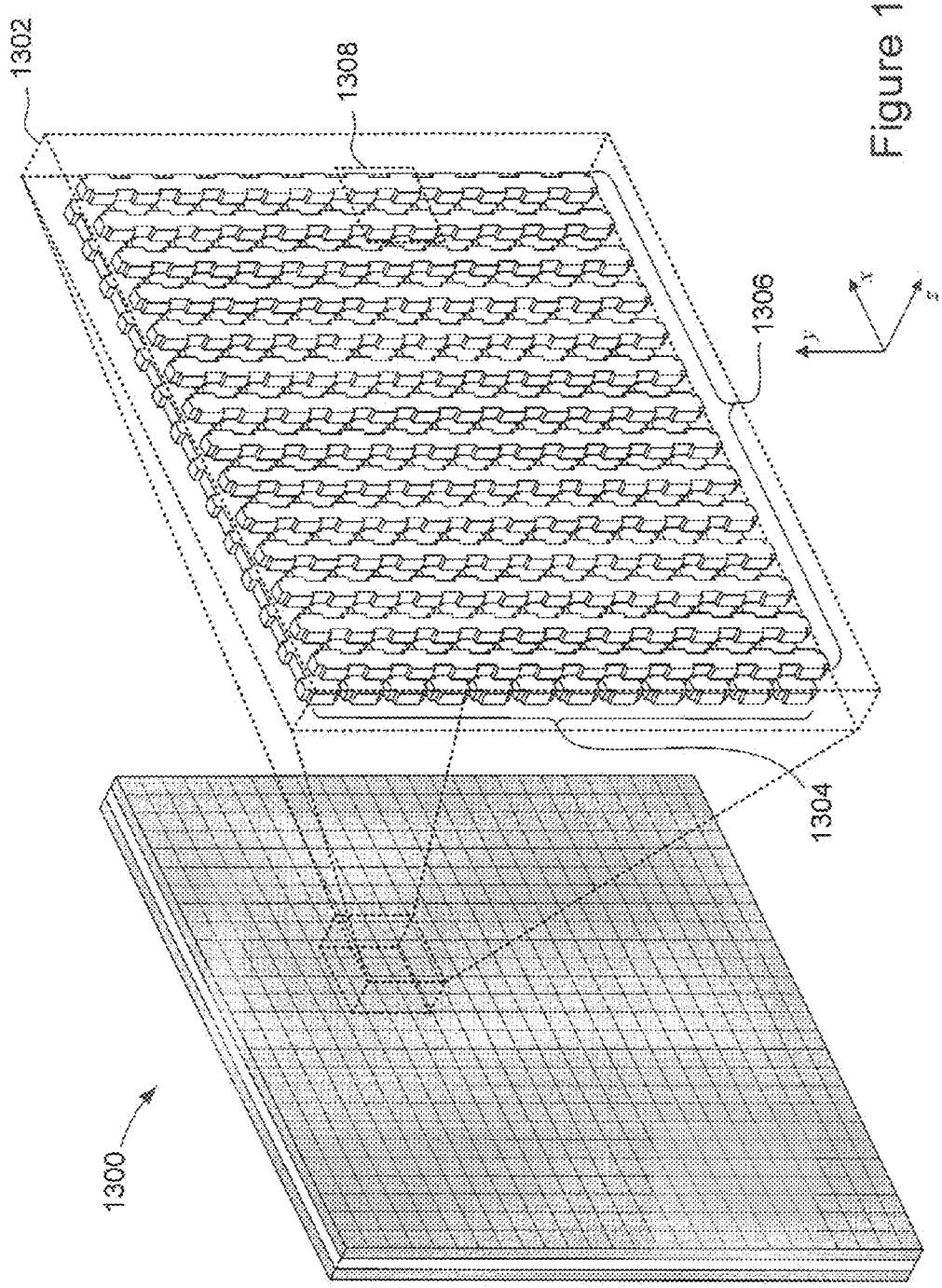
FIG. 13 shows an isometric view of an electronically reconfigurable negative index material crossbar configured in accordance with embodiments of the present invention.

FIG. 13 shows an isometric view of an electronically reconfigurable NIM crossbar 1300 configured in accordance with embodiments of the present invention. An enlarged region 1302 reveals that the NIM crossbar 1300 comprises a first layer of substantially parallel nanowires 1304 and a second layer of approximately parallel nanowires 1306, where the nanowires in the first layer 1304 are approximately perpendicular to the nanowires in the second layer 1306. The NIM crossbar 1300 includes grid lines that outline a two-dimensional array of squares. Each square represents a "phase-modulation element," which can be a single resonant element or two or more neighboring resonant elements, as describe below. Each phase-modulation element is configured and operated as described above with reference to the subsections Negative Index Material Crossbars and Resonant Elements. The NIM crossbar 1300 is a resonant plasmonic metamaterial that can be operated to exhibit negative refraction for electromagnetic radiation within particular wavelength bands of interest. The resonant behavior translates into transmission phase changes in the wavelengths of interest. The effective refractive index of each phase-modulation element can be independently and electronically controlled. In other words, each phase-modulation element is "electronically addressable."

Figure 14:
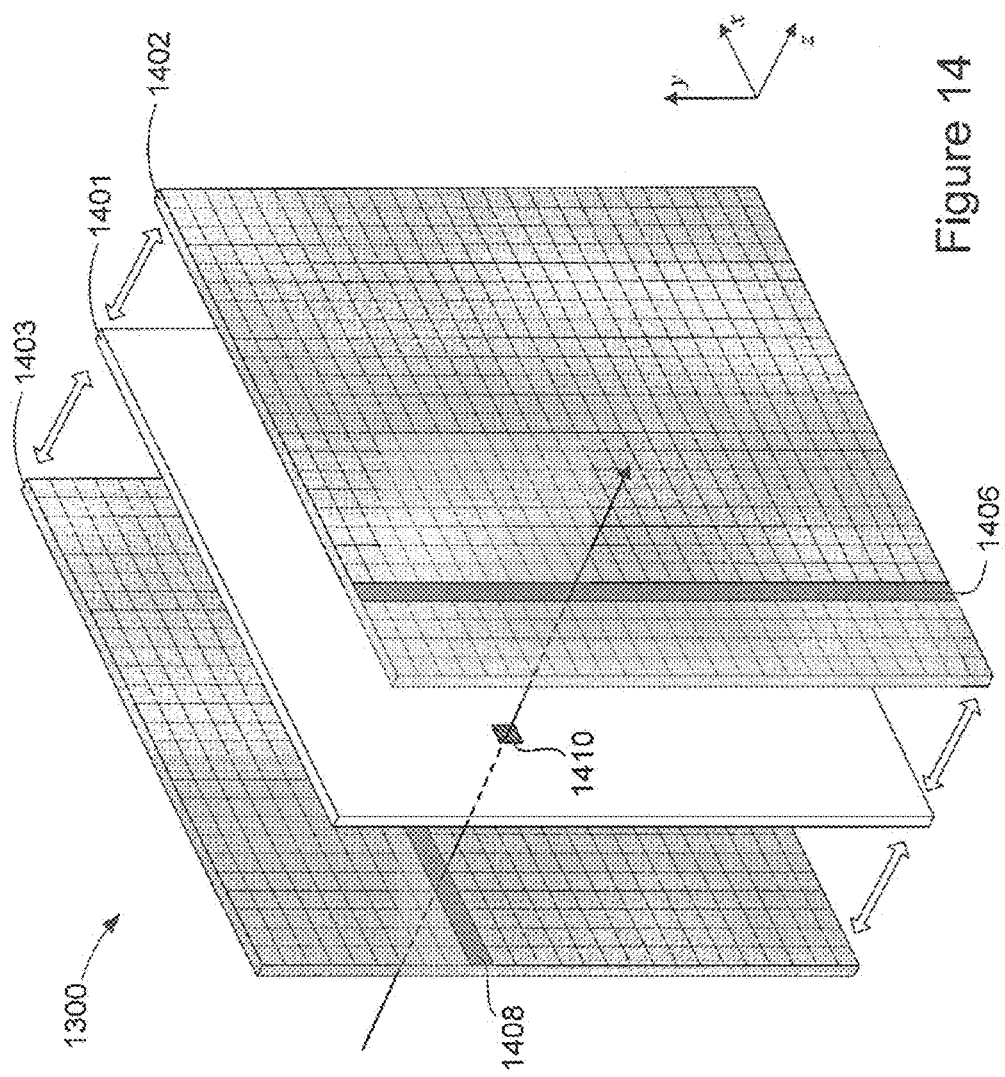
FIG. 14 shows an exploded isometric view of the negative index material crossbar shown in FIG. 13 in accordance with embodiments of the present invention.

FIG. 14 shows an exploded isometric view of the NIM crossbar 1300 comprising an intermediate layer 1401 sandwiched between two outer nanowire layers 1402 and 1403, as described above with reference to FIG. 6-8. The intermediate layer 1401 serves as a phase-modulation layer and can be configured to include a gain material as described below. Each phase-modulation element is electronically addressed by applying appropriate electronic signals to substantially orthogonal overlapping nanowires defining the phase-modulation element. For example, as shown in FIG. 14, applying an appropriate electronic signal to nanowires 1406 of nanowire layer 1402 and simultaneously applying an appropriate electronic signal to nanowires 1408 of nanowire layer 1403 produces a voltage across, or current passing through, a region 1410 of layer 1401 causing the refractive index of the region 1410 to change. The degree to which the refractive index is changed can be varied depending on the magnitude of the electronic signal applied to the region 1410.

Embodiments of the present invention include configuring the NIM crossbar 1300 with gain to compensate for losses associated with electromagnetic radiation having a wavelength band of interest transmitted through the NIM crossbar 1300. FIGS. 15A-15G show seven different ways in which an enlarged isometric region of four adjacent resonant elements 1308 of the NIM crossbar 1300, shown in FIG. 13, are configured to include gain and are merely representative of how the entire NIM crossbar 1300 can be configured to include gain in accordance with embodiments of the present invention. The gain material can be in the form of quantum wires, quantum dots, quantum wells, nanocrystals, or molecules embedded in a polymer or any other suitable material. In FIGS. 15A-15F, nanowires 1502 and 1504 represent portions of adjacent nanowires in the second layer 1306, and nanowires 1506 and 1508 represent portions of adjacent nanowires in the first layer 1304.

Figure 15A:
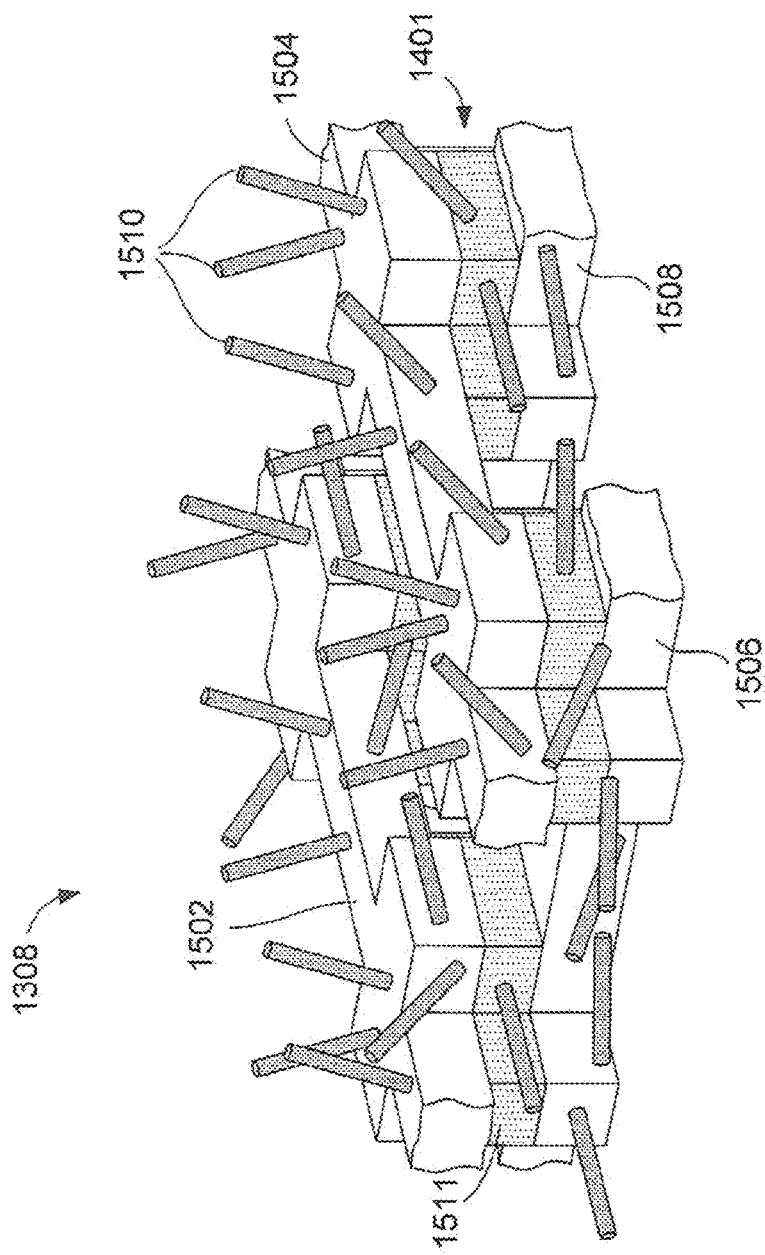

FIG. 15A shows quantum wires 1510 extending from resonant elements 1308. As shown in FIG. 15A, plus-shaped portions of the intermediate layer 1401 fill the space between the overlapping nanowires. For example, plus-shaped portion 1511 fills the space between overlapping nanowires 1502 and 1506. The quantum wires 1510 are grown on the exposed surfaces of the nanowires 1502, 1504, 1506, and 1508 and on the plus-shaped portions of the intermediate layer 1401. As shown in FIG. 15A, the quantum wires 1510 extend into the space between the nanowires.

FIG. 15B shows wires 1512 configured with quantum dots 1513 extending from resonant elements 1308. The wires can have diameters ranging from approximately 2 nm to approximately 10 nm. The electronic band gap associated with quantum dots 1513 is relatively smaller than the electronic band gap associated with the remaining portions of the wires 1512. The wires 1512 are grown on the exposed surfaces of the nanowires 1502, 1504, 1506, and 1508 and on the plus-shaped portions of the intermediate layer 1401. As shown in FIG. 15B, the quantum wires 1510 extend into the space between the nanowires. Embodiments of the present invention are not limited to wires 1512 having a single quantum dot. In other embodiments, two, three, or more quantum dots 1513 can be distributed along each of the wires 1512.

Figure 15C:
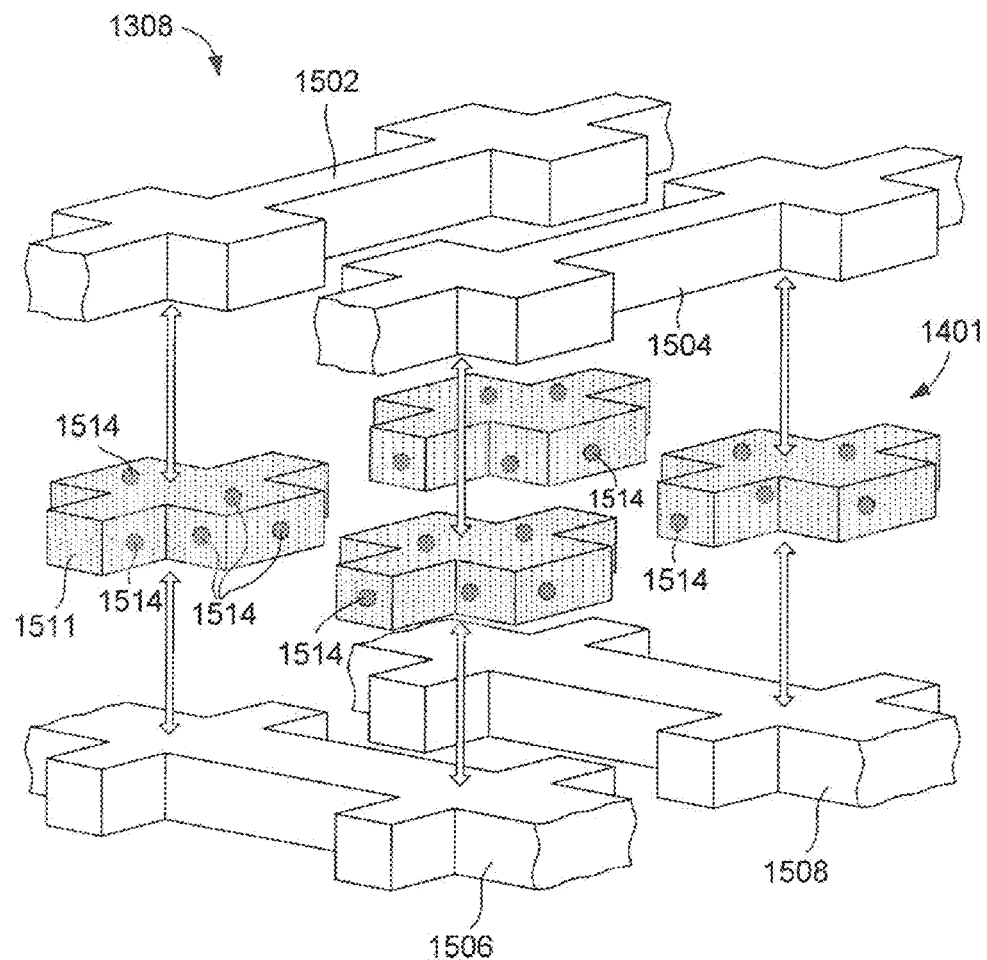

FIG. 15C shows an exploded isometric view of the resonant elements 1308 in order to reveal quantum dots or nanocrystals 1514 embedded in the plus-shaped portions of the intermediate layer 1401. For example, plus-shaped portion 1511 includes embedded quantum dots or nanocrystals 1514. The quantum dots or nanocrystals 1514 can be embedded in the plus-shaped portions during deposition of the intermediate layer 1401.

Note the quantum dots 1513 and 1514 can contain as few as approximately 100 atoms to approximately 100,000 atoms with a diameter ranging from approximately 10 atoms to approximately 50 atoms or approximately 2 nm to approximately 10 nm.

Figure 15D:
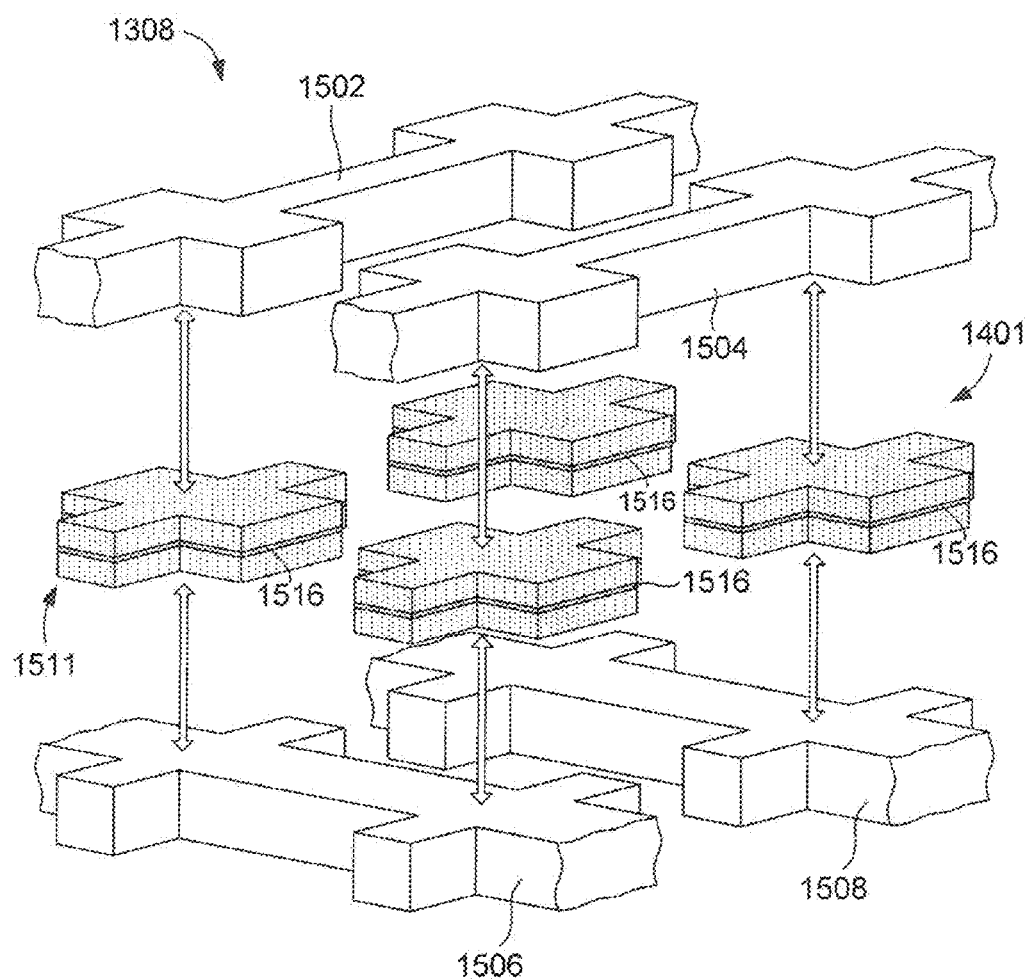

FIG. 15D shows an exploded isometric view of the resonant elements 1308 in order to reveal quantum wells 1516 embedded in the plus-shaped portions of the intermediate layer 1401. For example, plus-shaped portion 1511 includes an embedded quantum well 1516. The electronic band gap of the quantum wells 1516 is relatively smaller than the electronic band gap of the material comprising the remaining plus-shaped portions. The quantum wells 1516 can be formed in the plus-shaped portions as an intermediate deposition step in forming the intermediate layer 1401. Although FIG. 15D shows the plus-shaped portions as having only one quantum well 1516, in other embodiments, the plus-shaped portions can have two or more quantum wells 1516.

Figure 15E:
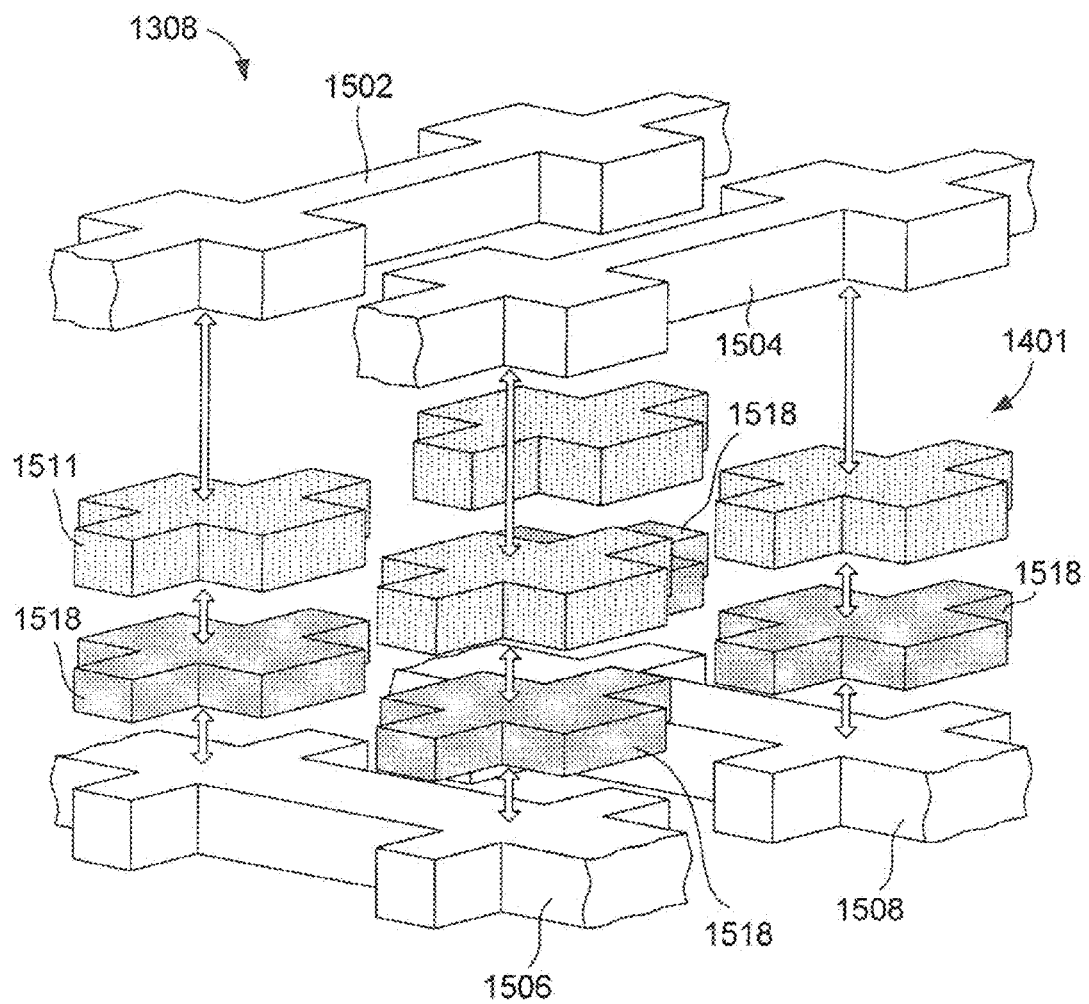

FIG. 15E shows an exploded isometric view of the resonant elements 1308 including plus-shaped portions 1518 of a gain-material layer disposed between the nanowires 1506 and 1508 and the plus-shaped portions comprise the intermediate layer 1401. In certain embodiments, the plus-shaped portions 1518 can be composed of a fluorescent or phosphorescent molecule, such as rhodamine-G6 or rhodamine-B, embedded in a transparent polymer. In other embodiments, the plus-shaped portions 1518 can be composed of quantum dots or nanocrystals 1514 embedded in a polymer or another suitable material having a relative larger electronic band gap than the quantum dots or nanocrystals, as described above with reference to FIG. 15C. In still other embodiments, the plus-shaped portions 1518 can be composed of one or more quantum wells 1516 embedded in a polymer or another suitable material having a relatively larger electronic band gap than the quantum wells, as described above with reference to FIG. 15D.

Figure 15F:
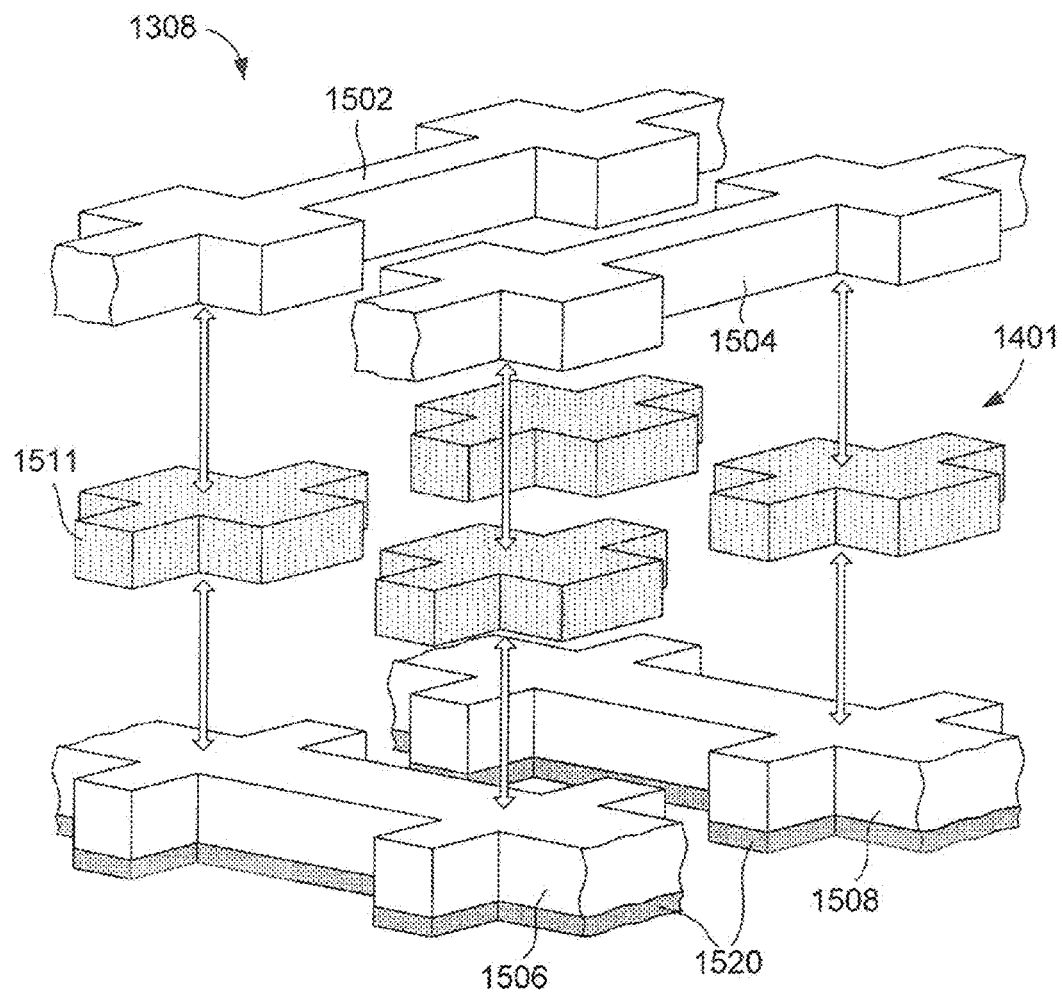

FIG. 15F shows an exploded isometric view of the resonant elements 1308 with a gain material layer 1520 disposed on the outer surface of the nanowires 1506 and 1508. The gain material layer 1520 can be composed of a fluorescent or phosphorescent molecule, such as rhodamine-G6 or rhodamine-B, embedded in a transparent polymer. In other embodiments, the gain material layer 1520 can be composed of quantum dots or nanocrystals 1514 embedded in a polymer or another suitable material having a relative larger electronic band gap than the quantum dots or nanocrystals, as described above with reference to FIG. 15C. In still other embodiments, the gain material layer 1520 can be composed of one or more quantum wells 1516 embedded in a polymer or another suitable material having a relatively larger electronic band gap than the quantum wells, as described above with reference to FIG. 15D.

Figure 15G:
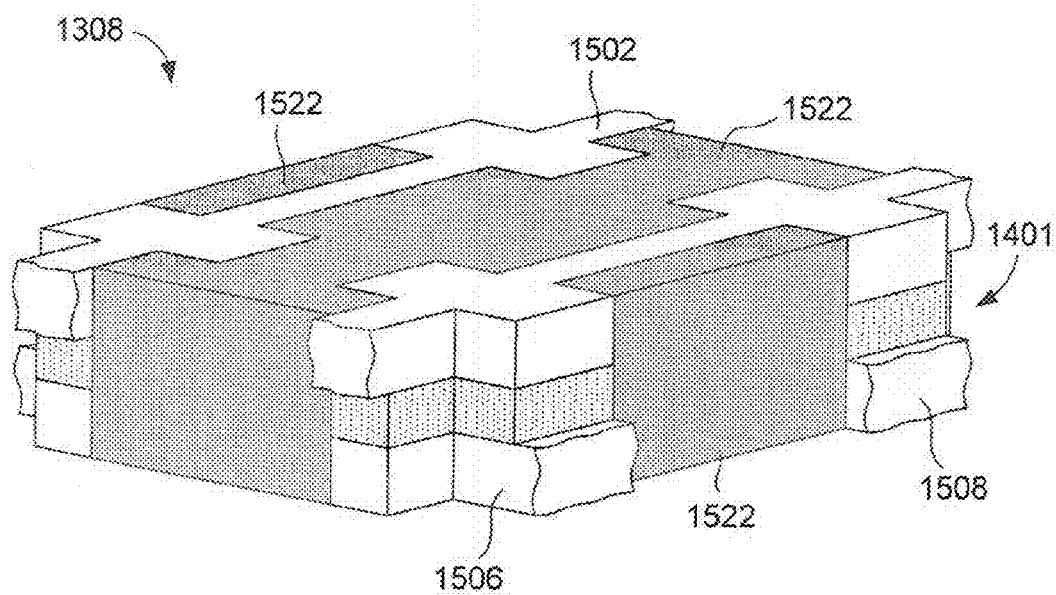

FIG. 15G shows a gain material 1522 filling the open regions surrounding the resonant elements 1308. The gain material 1522 can be composed of a fluorescent or phosphorescent molecule, such as rhodamine-G6 or rhodamine-B, embedded in a transparent polymer. In other embodiments, the gain material 1522 can be composed of quantum dots or nanocrystals 1514 embedded in a polymer or another suitable material having a relative larger electronic band gap than the quantum dots or nanocrystals, as described above with reference to FIG. 15C.

Figure 16B:
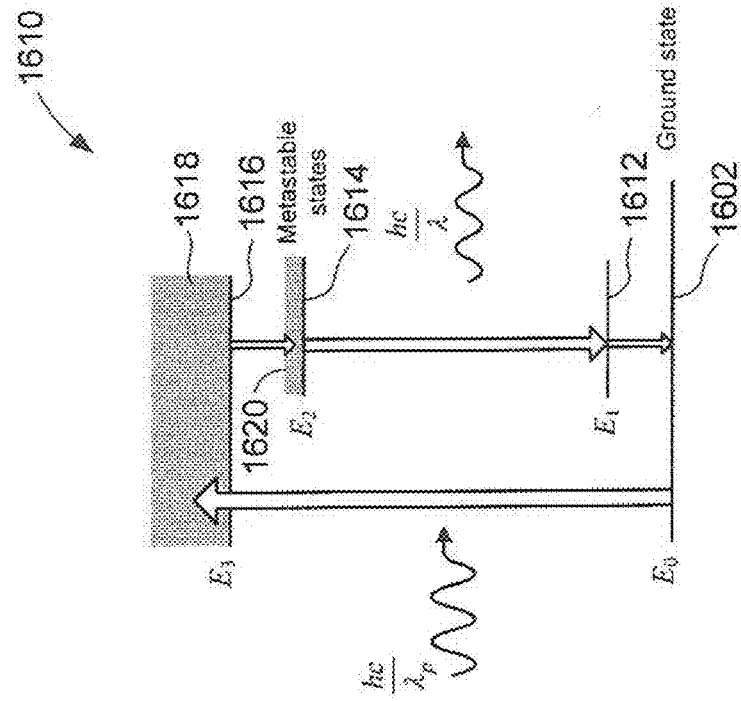
FIGS. 16A-16B show energy-level diagrams associated with three-level and four level quantum systems in accordance with embodiments of the present invention.
Figure 16A:
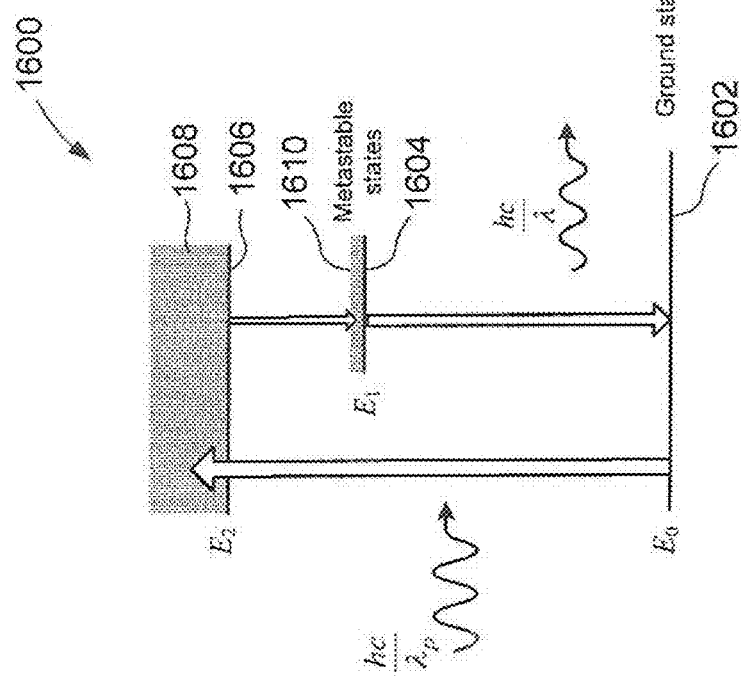

The quantum wires, quantum dots, quantum wells, nanocrystals, molecules embedded in a polymer or any other suitable material are quantum systems ("QSs"). The materials, size, and/or shape of the QSs can be selected to operate as four-level or three-level QSs emitting electromagnetic radiation within a wavelength band of interest. With reference to FIGS. 16A and 16B, the following discussion provides a general description of three- and four-level QSs.

FIG. 16A shows an energy-level diagram 1600 associated with a three-level QS. The energy-level diagram 1600 comprises of a ground state energy $E_0$ 1602, a first excited state energy $E_1$ 1604, and a second excited state energy $E_2$ 1606. Initially, the QS is in the ground electronic state $E_0$ 1602. Applying pump electromagnetic radiation with energy $hc/\lambda_p$ satisfying:

$$E_2 \leq \frac{hc}{\lambda_p}$$

where
$\lambda_p$ is the wavelength of the pump radiation,
c is the speed of light in free space, and
h is Planck's constant,
causes the three-level QS to make an electronic energy transition to an electronic state at or above the electronic state $E_2$ 1606 identified by shaded region 1608. The three-level QS transitions via a nonradiative relaxation process to the electronic energy $E_2$ 1606 where it remains for a short period of time before spontaneously decaying in another nonradiative transition to the relatively longer lived electronic states, called "metastable states," at or above $E_1$ 1604 and identified by shaded region 1610. The three-level QS can transition from a metastable state to the ground state via a spontaneous emission process or a stimulated emission. A spontaneous emission occurs when a QS spontaneously transitions from a metastable state to the ground state 1602. A stimulated emission occurs as a result of photons stimulating the QS to transition from the metastable state to the ground state 1602. In both radiative processes, the energy of the emitted electromagnetic radiation is $hc/\lambda$, where $\lambda$ is the wavelength of the emitted electromagnetic radiation satisfying the condition:

$$\frac{hc}{\lambda} < \frac{hc}{\lambda_p}$$

FIG. 16B shows an energy-level diagram 1610 associated with a four-level QS. The energy-level diagram 1610 comprises the ground state energy $E_0$ 1602, a first excited state energy $E_1$ 1612, a second excited state energy $E_2$ 1614, and a third excited state energy $E_3$ 1616. Initially, the four-level QS is in the ground electronic state 1602. Applying electromagnetic radiation with energy $hc/\lambda_p$ satisfying:

$$E_3 \leq \frac{hc}{\lambda_p}$$

causes the four-level QS to make an electronic energy transition to an electronic state at or above the electronic state $E_3$ 1616 identified by shaded region 1618. The four-level QS transitions via a nonradiative relaxation process to the electronic energy $E_3$ 1616 and remains in this electronic state for a short period of time before spontaneously decaying via a nonradiative transition to a relatively longer lived metastable state at or above the energy level $E_2$ 1614 identified by shaded region 1620. The four-level QS transitions from the metastable state 1614 to an electronic state $E_1$ 1612 via a spontaneous or a stimulated radiative emission and then rapidly decays to the ground state 1602 via another nonradiative relaxation process. The energy of the emitted electromagnetic radiation $hc/\lambda$ in the radiative emission is less than $hc/\lambda_p$.

As long as electromagnetic radiation with the pump wavelength $\lambda_p$ is applied to either the three-level or four-level QS, electromagnetic radiation with the wavelength $\lambda$ in the wavelength band of interest is emitted.

The material, size, and shape of the QS can be selected to essentially require shorter pump wavelengths $\lambda_p$ and emit relatively longer wavelength radiation $\lambda$ that lies within the wavelength band of interest. In particular, the quantum dots, nanocrystals, and quantum wells can be composed of elemental, III-V, or II-VI semiconductors.

Figure 17A:
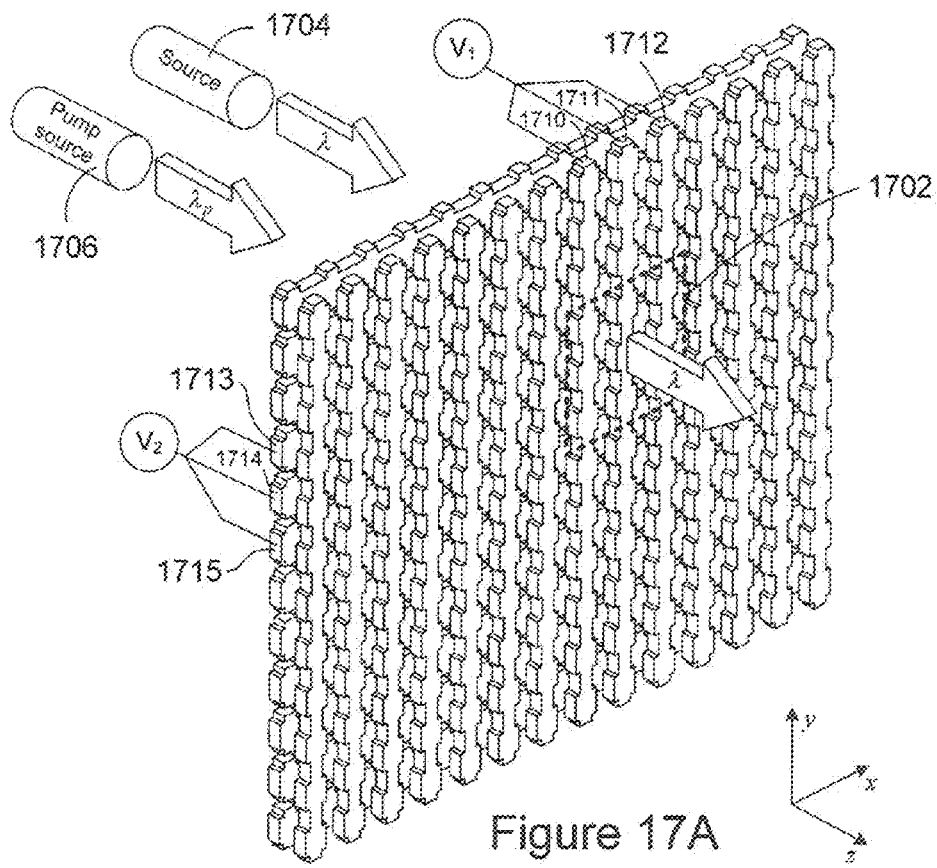
FIG. 17A shows an isometric view of an enlarged region of the the negative index material crossbar shown in FIG. 13 in accordance with embodiments of the present invention.

FIG. 17A shows an isometric view of an enlarged region of the NIM crossbar 1300 shown in FIG. 13 in accordance with embodiments of the present invention. The NIM crossbar 1300 is configured with a gain material as described above with reference to FIG. 15. A phase-modulation element 1702 composed of a square array of 9 resonant elements is identified in FIG. 17A by a dashed-line enclosure. A source 1704 produces electromagnetic radiation with the wavelength $\lambda$ in the wavelength band of interest. A pump source 1706 produces electromagnetic radiation with a relatively shorter pump wavelength $\lambda_p$ that causes the gain material to emit electromagnetic radiation with substantially the same wavelength $\lambda$, as described above with reference to FIG. 16. The nanowires of the phase-modulation element 1702 are electronically coupled to voltage sources so that the resonant elements of the phase-modulation element 1702 can be individually and electronically addressed. The effective refractive indices of the resonant elements comprising the phase-modulation element 1702 are changed by applying the same voltage $V_1$ to the nanowires 1710-1712 and a different voltage $V_2$ to the nanowires 1713-1715 resulting in the same voltage applied across each of the nine resonant elements of the phase-modulation element 1702. As a result, the effective refractive indices of the resonant elements comprising the phase-modulation element 1702 are changed to approximately the same effective refractive index, and electromagnetic radiation with the wavelength $\lambda$ is transmitted through the phase-modulation element 1702 and acquires a corresponding transmission phase shift, as described above with reference to FIG. 9.

Figure 17B:
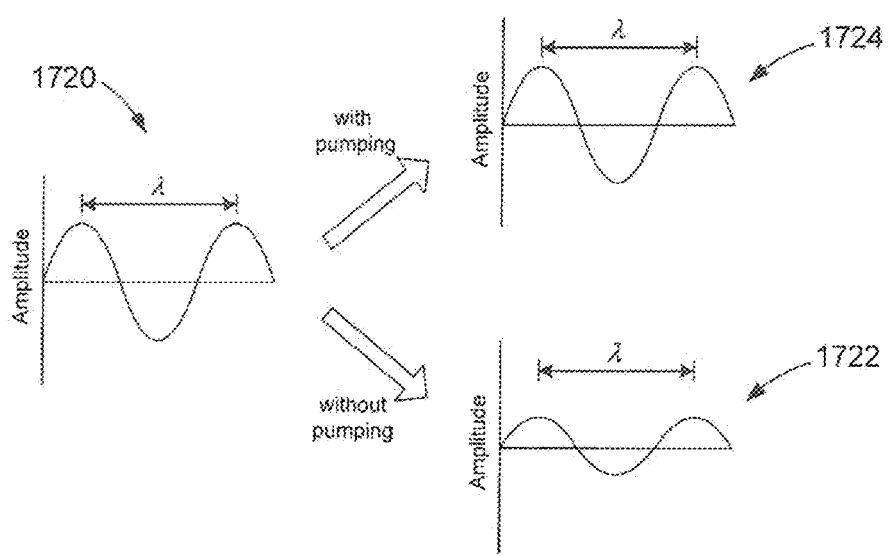
FIG. 17B shows plots of electromagnetic radiation transmitted through a phase-modulation element when pump radiation is applied and when pump radiation in not applied in accordance with embodiments of the present invention.

FIG. 17B shows plots of electromagnetic radiation transmitted through a phase-modulation element when pump radiation is applied and when pump radiation in not applied in accordance with embodiments of the present invention. Plot 1720 shows the amplitude of electromagnetic radiation with the wavelength $\lambda$ output from the source 1704 prior to passing through the phase-modulation element 1702. Plot 1722 reveals that when no pump radiation is applied to the NIM crossbar 1300, the amplitude of the electromagnetic radiation passing through the phase-modulation element 1702 diminishes due to loss. On the other hand, plot 1724 reveals that when pump radiation is applied to the NIM crossbar 1300, the amplitude of the electromagnetic radiation passing through the phase-modulation element 1702 is substantially restored. In other words, the gain material generates electromagnetic radiation with the wavelength $\lambda$ that compensates for the loss and in certain embodiments may even enhance the amplitude of the transmitted electromagnetic radiation.

Returning to FIG. 17A, the pump source 1706 is shown as emitting pump radiation in substantially the z-direction. In other embodiments, the pump source 1706 can be repositioned to pump the gain material of the NIM crossbar 1300 from any angle ranging from substantially parallel to the z-direction to substantially within the xy-plane of the NIM crossbar 1300.

Embodiments of the present invention are not limited to phase-modulation elements comprising a square array of nine resonant elements. Because voltages can be applied to individual crossed nanowires, the intermediate layer 1401 can be configured for single phase-modulation elements ranging from as few as 1 to hundreds or even thousands of resonant elements. In addition, the individual nanowires enable phase-modulation elements to have various shapes such as square, rectangular, circular, elliptical, triangular, or any other suitable shape.

In practice, the entire NIM crossbar 1300 is exposed the pump radiation in a process called "flood pumping." However, in practice, a portion of the pump radiation may be transmitted through the NIM crossbar 1300 and may interfere with the optical properties of the NIM crossbar 1300 interaction with wavelengths in the wavelength band of interest. For example, the NIM crossbar 1300 can be operated to reproduce the reflected wavefronts of objects in an electronically reconfigurable hologram. The transmitted wavelength $\lambda$ of the holographic image may be in the lower energy visible portion of the electromagnetic spectrum (e.g., yellow to red) while the wavelength $\lambda_p$ of the pump radiation is in the relatively higher energy portion of the electromagnetic spectrum (e.g., blue to violet). Transmission of even a portion of the pump radiation through the NIM crossbar 1300 may reduce the quality of the three-dimensional image generated by the hologram. In certain embodiments, this can be avoided by using pump radiation outside the visible portion of the electromagnetic spectrum, such ultraviolet wavelengths. In other embodiments, a filter can be place on the output side of the NIM crossbar 1300 to substantially block the pump radiation. FIG. 18A shows a schematic representation of a filter 1800 disposed near the NIM crossbar 1300 in accordance with embodiments of the present invention. As shown in FIG. 18A, the electromagnetic radiation output from the sources 1704 and 1706 passes through the NIM crossbar 1300. The filter 1800 can be a Bragg mirror configured to effectively block a relative narrow band of wavelengths including the pump wavelength $\lambda_p$ but does not block wavelengths in the wavelength band of interest.

Figure 18B:
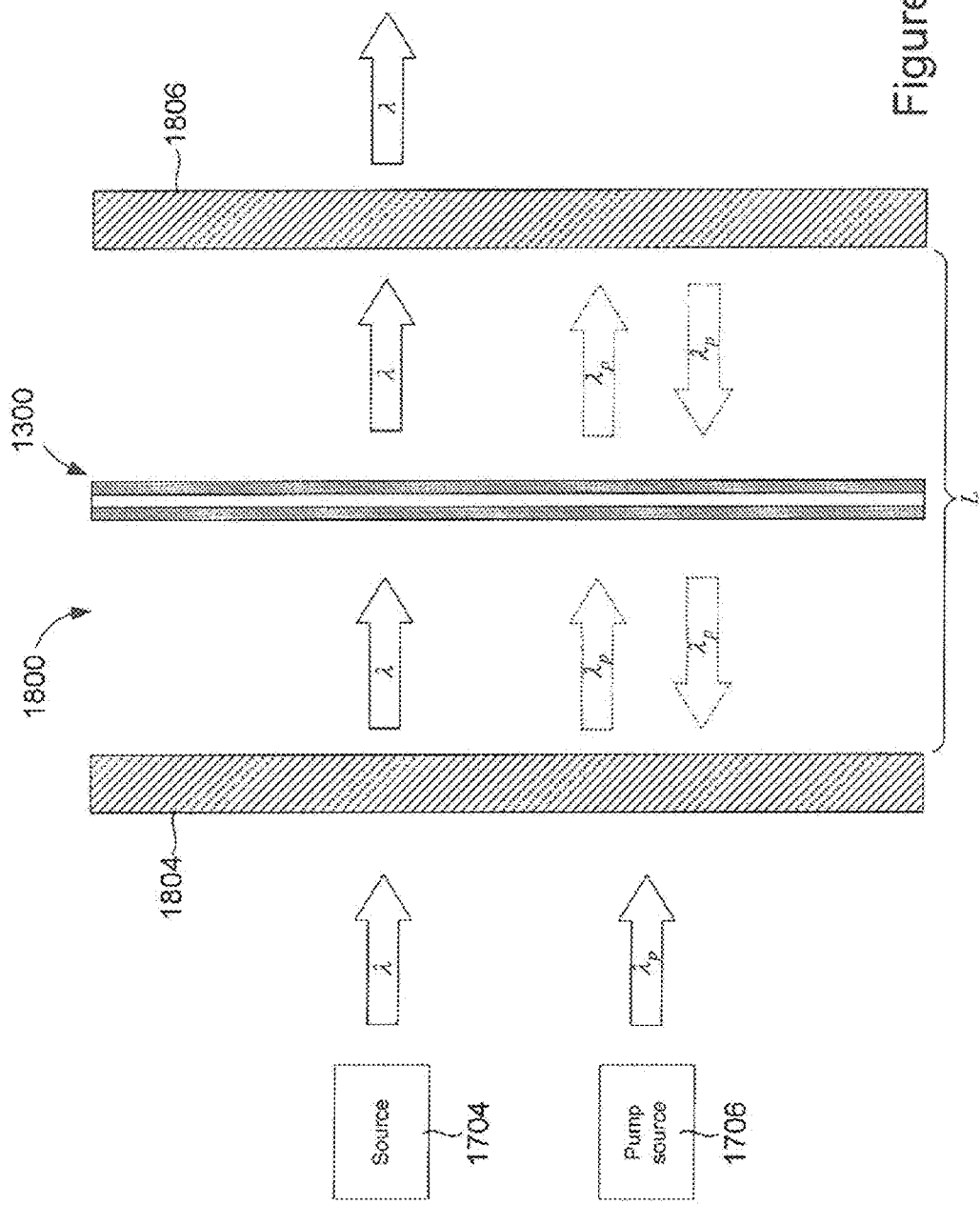
FIG. 18B shows a schematic representation of a negative index material crossbar disposed within a cavity in accordance with embodiments of the present invention.

Embodiments of the present invention include a resonator for the pump wavelength $\lambda_p$ in order to increase interaction of the pump wavelength $\lambda_p$ with the gain material. In particular, the NIM crossbar 1300 can be inserted in a cavity configured to trap the pump wavelength $\lambda_p$. FIG. 18B shows a schematic representation of the NIM crossbar 1300 inserted in a cavity 1802 configured to have resonance with the pump wavelength in accordance with embodiments of the present invention. The cavity 1802 comprises a partially reflective mirror 1804 and a reflective mirror 1806 with respect to the pump wavelength $\lambda_p$. The mirrors 1804 and 1806 are configured to transmit the wavelengths $\lambda$ in the wavelength band of interest. For example, the mirrors 1804 and 1806 can be Bragg mirrors configured so that the mirror 1804 is partially reflective to the pump wavelength $\lambda_p$, enabling the pump wavelength $\lambda_p$ to enter the cavity, and the mirror 1806 is configured to be reflective for the pump wavelength $\lambda_p$. As shown in FIG. 18B, in order to create resonant conditions in the cavity 1802, such as constructive interference and a standing wave with the pump wavelength $\lambda_p$, the mirrors 1804 and 1806 are disposed at a distance:

$$L = \frac{m\lambda_p}{2}$$

where m is a non-negative integer.

Figure 19:
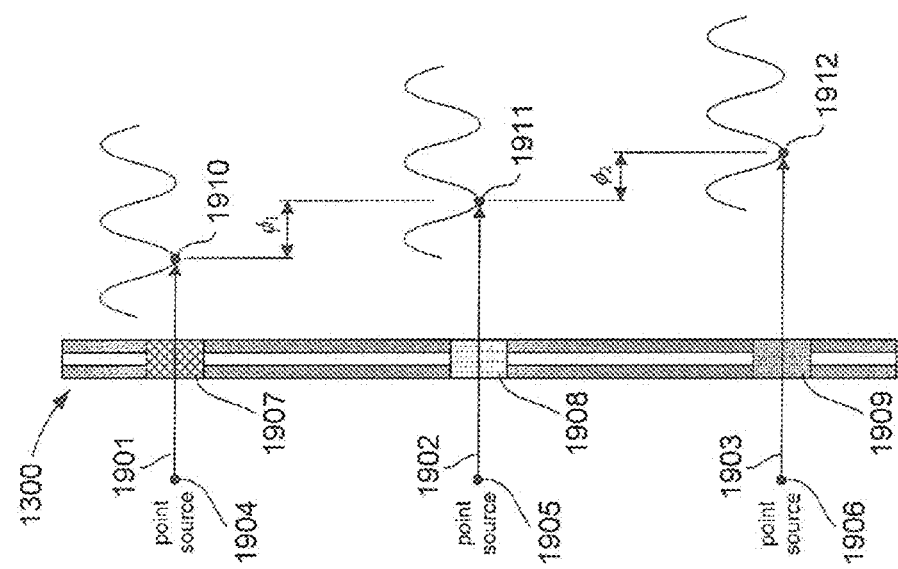
FIG. 19 shows a side view of electromagnetic radiation transmitted through three phase-modulation elements of the negative index material crossbar shown in FIG. 13 operated in accordance with embodiments of the present invention.

FIG. 19 shows a side view of rays of light transmitted through three phase-modulation elements of the NIM crossbar 1300 operated in accordance with embodiments of the present invention. Rays of light 1901-1903 emanating from point sources 1904-1906 pass through phase-modulation elements 1907-1909, respectively. In the example shown in FIG. 19, each phase-modulation element is electronically addressed, as described above with reference to FIG. 14, and has a different refractive index with phase-modulation element 1907 having the largest refractive index, phase-modulation element 1908 having the second largest refractive index, and phase-modulation element 1909 having the smallest refractive index. As rays 1901-1903 enter associated phase-modulation element 1907-1909, the light slows to a velocity v=c/n where v is the velocity of light propagating through a phase-modulation element, c is the speed of light in free space, and n is the magnitude of effective refractive index of the associated phase-modulation elements. Thus, ray 1904 passing through the phase-modulation element 1907 with the slowest velocity, ray 1905 passing through the phase-modulation element 1908 with the second slowest velocity, and ray 1906 has the highest relative velocity.

As shown in FIG. 19, points 1910-1912 represent points on electromagnetic waves that simultaneously enter the phase-modulation elements 1907-1909, respectively, but due to the different refractive indices at the phase-modulation elements, the points 1910-1912 of the electromagnetic waves emerge at different times from the phase-modulation element 1907-1909 and, therefore, are located at different distances from the NIM crossbar 1300. In other words, the electromagnetic waves emerging from the phase-modulation element 1907-1909 acquire transmission phase shifts. As shown in FIG. 19, the relative phase difference between the electromagnetic waves emerging from phase-modulation element 1907 and 1908 is $\phi_1$ and the relative phase difference between electromagnetic waves emerging from phase-modulation element 1908 and 1909 is $\phi_2$, with the greatest relative phase difference of $\phi_1+\phi_2$ for electromagnetic waves emerging from phase-modulation element 1907 and 1909. The electronic signals applied to the phase-modulation elements 1907-1909 can be rapidly modulated, which, in turn, rapidly modulates the refractive indices of the phase-modulation elements 1907-1909 resulting in rapid changes in relative phase differences between rays emerging from the phase-modulation element 1907-1909.

Figure 20:
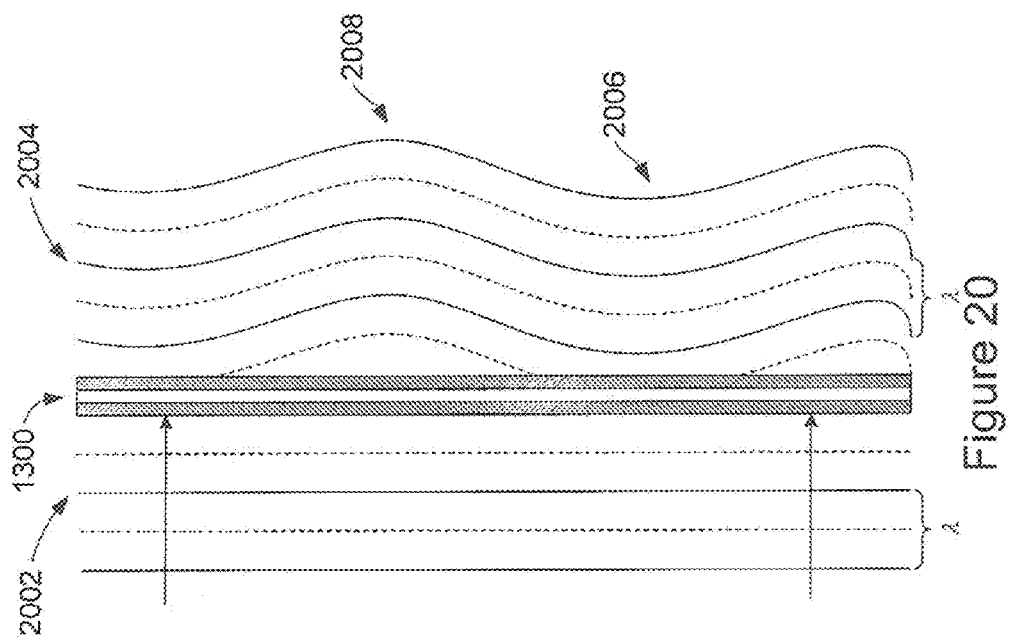
FIG. 20 shows a side view of electromagnetic radiation entering and emerging from the negative index material crossbar shown in 13 in accordance with embodiments of the present invention.

FIG. 20 shows a side view of quasimonochromatic light entering and emerging from the NIM crossbar 1300 in accordance with embodiments of the present invention. Ideally monochromatic light is transmitted through the NIM crossbar 1300. However, in practice it is recognized that a light source does not emit true monochromatic light but instead emits light in a narrow band of wavelengths called "quasimonochromatic light." A beam of quasimonochromatic light enters the NIM crossbar 1300 with uniform wavefronts 2002 having the wavelength $\lambda$ in the wavelength band of interest. Each wavefront crest is identified by a solid line and each wavefront trough is identified by a dashed line. Each wavefront enters the NIM crossbar 1300 with substantially the same phase. The phase-modulation elements (not identified) of the NIM crossbar 1300 are selectively addressed to produce non-uniform wavefronts 2004 by affecting the phase of different portions of the non-uniform wavefront 2004. The non-uniform wavefronts 2004 can result from certain portions of the incident uniform wavefronts 2002 passing through phase-modulation elements that have been electronically configured with relatively different refractive index magnitudes. For example, portions of non-uniform wavefronts in region 2006 emerge from the NIM crossbar 1300 later than portions of non-uniform wavefronts in region 2008. In other words, the NIM crossbar 1300 is configured to introduce relatively large transmission phase differences between portions of wavefronts emerging in region 2006 and portions of wavefronts emerging in region 2008.

The NIM crossbar 1300 can be operated by a computing device that allows a user to electronically address each resonant element as described above with reference to FIG. 17. In practice, the computing device can be any electronic device, including, but not limited to: a desktop computer, a laptop computer, a portable computer, a display system, a computer monitor, a navigation system, a personal digital assistant, a handheld electronic device, an embedded electronic device, or an appliance.

Figure 21:
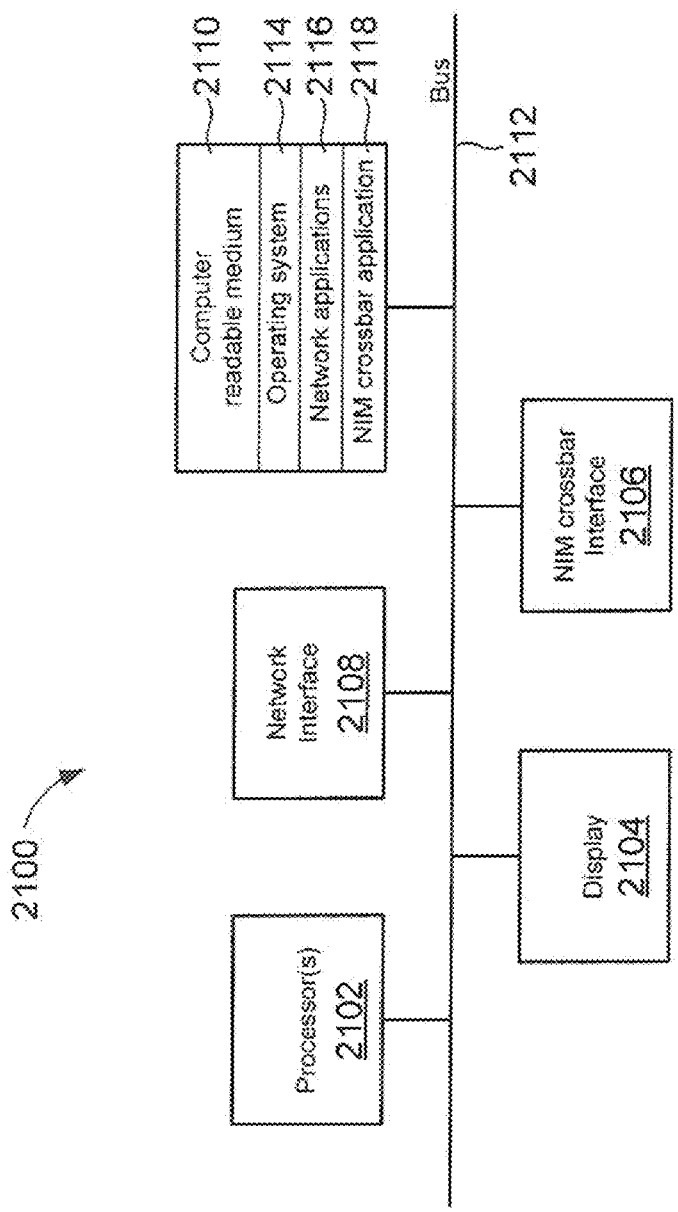
FIG. 21 shows a schematic representation of a computing device configured in accordance with embodiments of the present invention.

FIG. 21 shows a schematic representation of a computing device 2100 configured in accordance with embodiments of the present invention. The system 2100 includes one or more processors 2102, such as a central processing unit; one or more display devices 2104, such as a monitor; an NIM crossbar 1300 interface 2106; optionally one or more network interfaces 2108, such as a USB port, an Ethernet, or FireWire port; one or more computer-readable mediums 2110. Each of these components is operatively coupled to one or more buses 2112. For example, the bus 2112 can be an EISA, a PCI, a USB, a FireWire, a NuBus, or a PDS.

The computer readable medium 2110 can be any medium that participates in providing instructions to the processor 2102 for execution and storage of data regarding electronically addressing the NIM crossbar 1300. For example, the computer readable medium 2110 can be non-volatile media, such as an optical or a magnetic disk; volatile media, such as memory; and transmission media, such as coaxial cables, copper wire, and fiber optics. Transmission media can also take the form of acoustic, electromagnetic radiation, or radio frequency waves.

The computer-readable medium 2110 also includes an operating system 2114, such as Mac OS, Windows, Unix, and Linux; a network communications module 2116; and a NIM crossbar application 2118. The operating system 2114 can be multi-user, multiprocessing, multitasking, multithreading, real-time and the like. The operating system 2114 can also perform basic tasks such as recognizing input from input devices, such as a keyboard or a keypad; sending output to the display 2104; keeping track of files and directories on medium 2110; controlling peripheral devices, such as disk drives, printers, and the NIM crossbar 1300; and managing traffic on the one or more buses 2112. The network applications 2116 includes various components for establishing and maintaining network connections, such as software for implementing communication protocols including TCP/IP, HTTP, Ethernet, USB, and FireWire. The computer readable medium 2110 can also store other software applications, including word processors, browsers, e-mail, Instant Messaging, and media players.

The NIM crossbar application 2118 provides various software components for enabling electronic addressing of resonant elements of the NIM crossbar 1300, as described above with reference to FIGS. 15-17. In certain embodiments, some or all of the processes performed by the application 2118 can be integrated into the operating system 2114. In certain embodiments, the processes can be at least partially implemented in digital electronic circuitry, or in computer hardware, firmware, software, or in any combination thereof.

Figure 22:
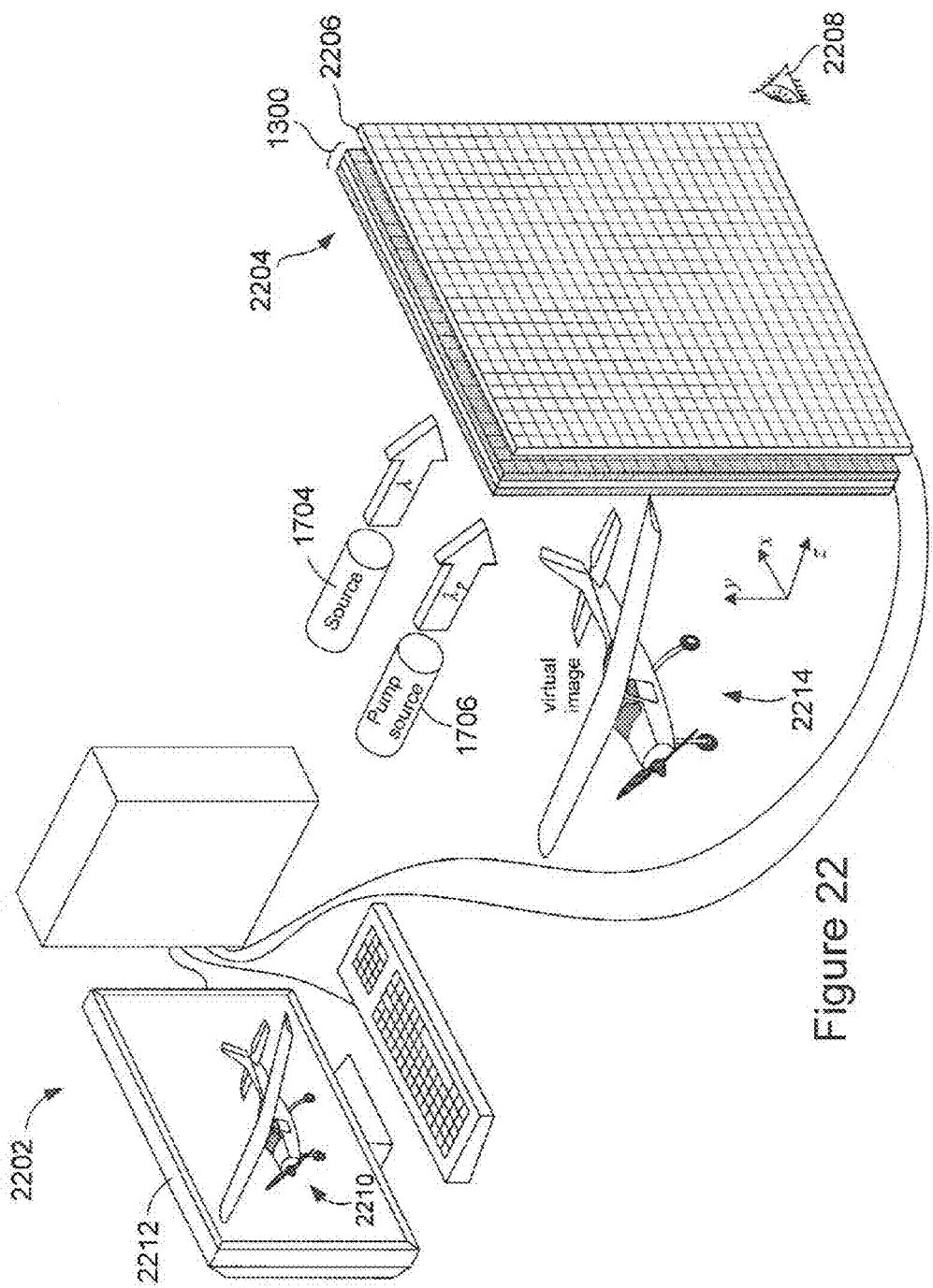
FIG. 22 shows an exemplary system for generating a three-dimensional holographic image in accordance with embodiments of the present invention.

In certain embodiments, the NIM crossbar 1300 can be operated in an electronically reconfigurable hologram to reproduce the reflected wavefront of objects. FIG. 22 shows an example of a system for generating a three-dimensional color holographic image in accordance with embodiments of the present invention. The system comprises a desktop computer 2202, an electronically reconfigurable hologram 2204, the source 1704, and the pump source 1706. In other embodiments, the source 1704 can be any white light source and the desktop computer 2202 can be replaced by any suitable computing device. The electronically reconfigurable hologram comprises a NIM crossbar 1300 and an intensity-control layer 2206. A three-dimensional image of an object can be displayed on one side of the hologram 2204 as follows. The source 1704 is positioned and configured to emit quasimonochromatic light that passes through the electronically addressed NIM crossbar 1300 and the intensity-control layer 2206. A program stored on the computer 2202 displays the image as a three-dimension object by translating the data files into electronic signals and corresponding electronic addresses that are applied to particular phase-modulation elements in of the NIM crossbar 1300 and to particular intensity-control elements of the intensity-control layer 2206. Light passing through each phase-modulation element acquires an appropriate transmission phase in order to reproduce the wavefront reflected by the object over a range of viewing angles. The same light also passes through corresponding intensity-control elements that adjust the intensity of the light. As a result, the image stored in the computer is perceived by a viewer 2208 as a virtual three-dimensional holographic image of an object suspended behind the hologram 2204. For example, as shown in FIG. 22, the computer 2202 displays a two-dimensional image of an airplane 2210 on a monitor 2212 and displays a virtual three-dimensional holographic image 2214 of the same airplane that appears to the viewer 2208 to be on the side of the hologram 2204 opposite the viewer 2208. The viewer 2208 looking at the hologram 2204 perceives the airplane 2210 in depth by varying the position of her head or changing her perspective of the view.

In certain embodiments, the intensity-control layer 2206 can be a liquid crystal layer. Each intensity-control element typically consists of a layer of liquid crystal molecules aligned between two transparent electrodes and two polarizing filters with substantially perpendicular axes of transmission. The electrodes are composed of a transparent conductor such as Indium Tin Oxide ("ITO"). Thus, with no liquid crystal filling the intensity-control element between the polarizing filters, light passing through the first filter is blocked by the second filter. The surfaces of the transparent electrodes contacting the liquid crystal material are treated with a thin polymer molecule that aligns the liquid crystal molecules in a particular direction.

In other embodiments, two or more holographic images can be displayed. In addition, because the NIM crossbar 1300 is dynamically controlled and the refractive index of each phase-modulation element can be rapidly changed, holographic motion pictures can also be displayed using the hologram 2204

In still other embodiments, color filters can be placed over each intensity-control element of the intensity-control layer 2206 so that colored light emerges from each intensity-control element. For example, three adjacent intensity-control elements can be combined to form an RGB ("red, green, blue") color pixel. Red, green, and blue primary color filters can be placed over each of three adjacent intensity-control pixels. A red filter can be placed over a first pixel, a blue filter can be placed over a second pixel, and a green filter can be placed over a third pixel. Light of varying colors can be generated by varying the intensity of light passing through each of the three pixels of the RGB pixel.

Figure 23:
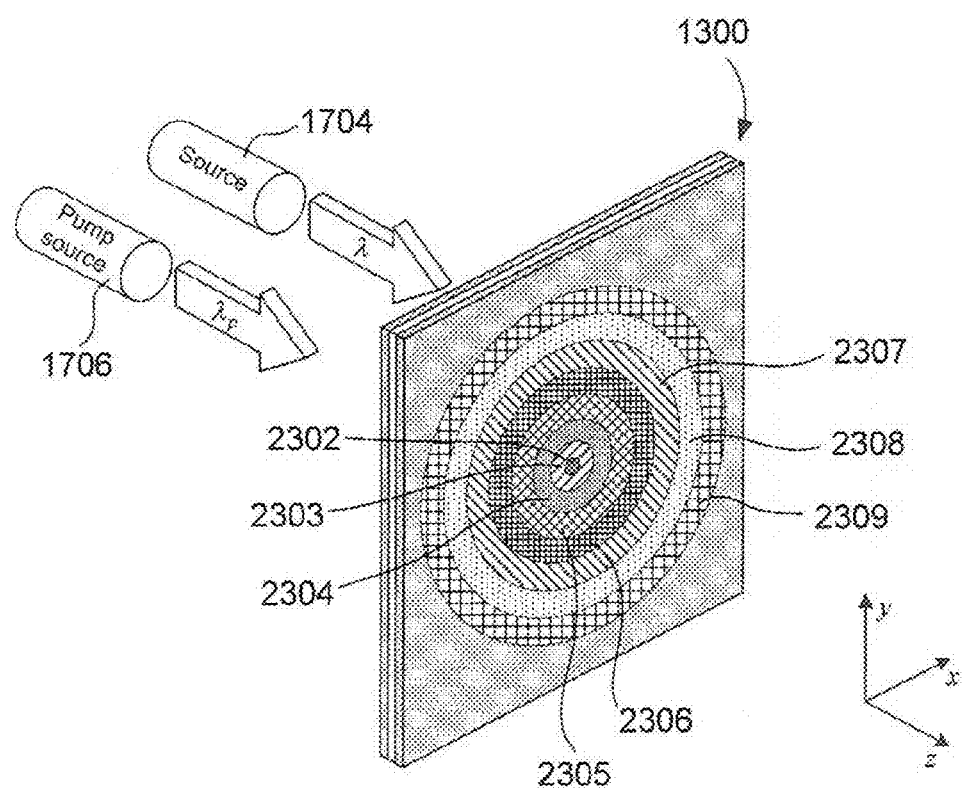
FIG. 23 shows a schematic representation of the negative index material crossbar shown in FIG. 13 configured as optical device in accordance with embodiments of the present invention.

In other embodiments, the NIM crossbar 1300 can be operated as an optical device, such as a lens or a prism with pump radiation applied to enhance the intensity of the emerging beam. FIG. 23 shows a schematic representation of the NIM crossbar 1300 operated as a converging or a diverging lens in accordance with embodiments of the present invention. The NIM crossbar 1300 includes an effective refraction index pattern of annular regions 2302-2309 emanating from the center of the NIM crossbar 1300 each represent electronically configured phase-modulation elements having substantially the same effective refractive index. For example, the phase-modulation elements in annular region 2304 are electronically configured to have substantially the same effective refractive index.

Figure 24A:
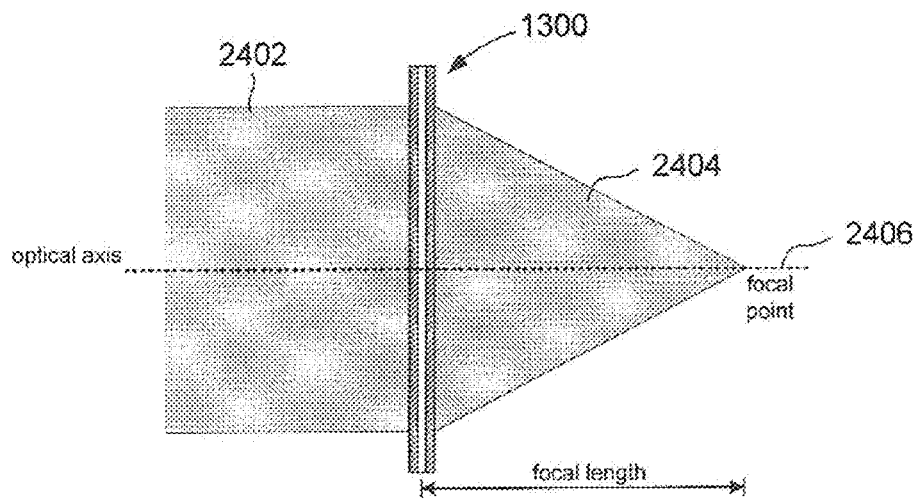
FIG. 24A-24C shows a side view of the negative index crossbar shown in FIG. 13 operated as an optical device in accordance with embodiments of the present invention.

FIG. 24A shows a side view of the NIM crossbar 1300 operated as a converging lens in accordance with embodiments of the present invention. The effective refractive index of the annular regions 2302-2309 decreases from the inner most annular region 2302 to the outer most annular region 2309. For example, the magnitude of the effective refractive index of the annular region 2302 is larger than the effective refractive index of the outer annular region 2309. The relative rate at which portions of a beam of electromagnetic radiation 2402 of an appropriate wavelength $\lambda$ passes through the NIM crossbar 1300 increases from the physical center of the NIM crossbar 1300 toward the outer regions of the NIM crossbar 1300. As a result, the beam 2402 experiences a decreasing effective refractive index emanating from the center of the NIM crossbar 1300 and an emerging beam 2404 is focused on the focal point 2406.

Figure 24B:
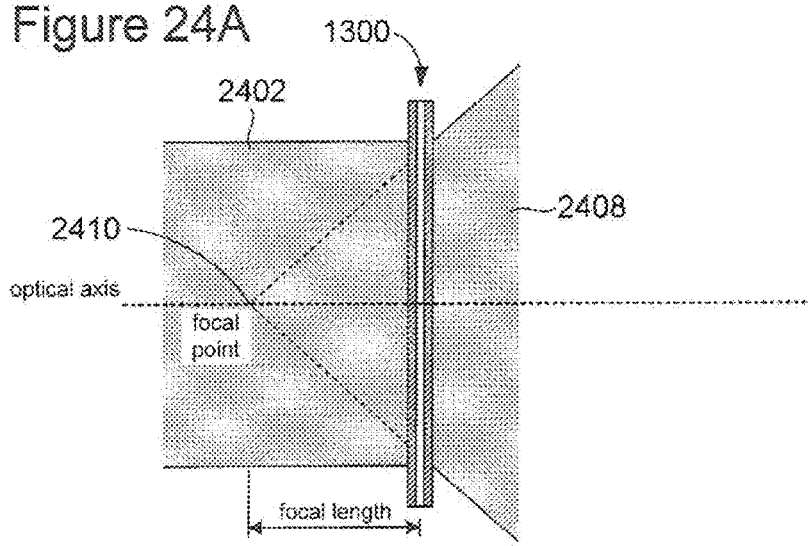

FIG. 24B shows a side view of the NIM crossbar 1300 operated as a diverging lens. The effective refractive index of annular regions 2302-2309 increases from the inner most annular region 2302 to the outer most annular region 2309. For example, the magnitude of the effective refractive index of the annular region 2302 is smaller than the effective refractive index of the outer annular region 2309. The relative rate at which portions of the beam 2402 pass through the NIM crossbar 1300 decreases from the physical center of the NIM crossbar 1300 toward the outer regions of the NIM crossbar 1300. As a result, the beam 2402 experiences an increasing effective refractive index emanating from the center of the NIM crossbar 1300 and an emerging beam 2408 diverges as if the emerging light originated from a focal point 2410.

Figure 24C:
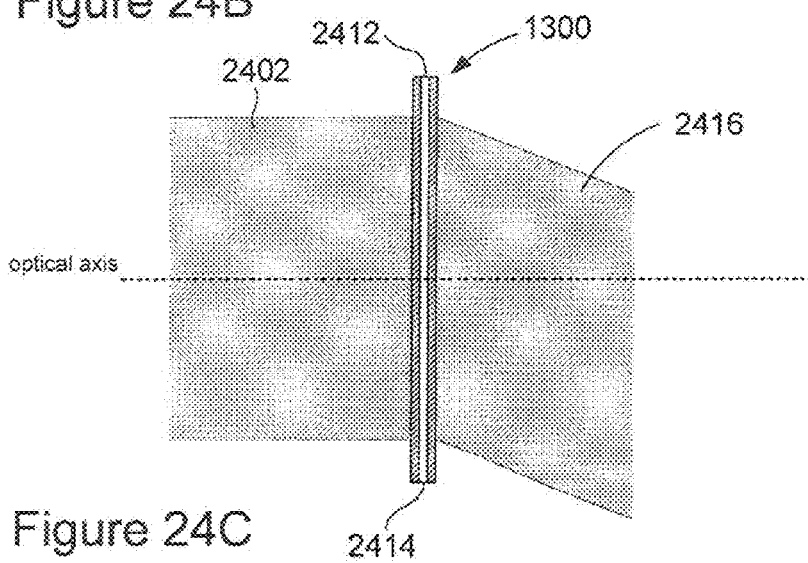

FIG. 24C shows a side view of the NIM crossbar 1300 operated as a prism wherein the magnitude of the effective refractive index increase from the edge 2412 to the edge 2414. The beam 2402 experiences an increasing effective refractive index toward the edge 2414 producing a refracted beam 2416.

Because the NIM crossbar 1300 is electronically reconfigurable, the focal length can be adjusted electronically and the NIM crossbar 1300 can be switched from operating as one optical device to operate as a different optical device. For example, the same NIM crossbar 1300 can initially be operated as a converging lens and electronically reconfigured to operate as a diverging lens.

Figure 25:
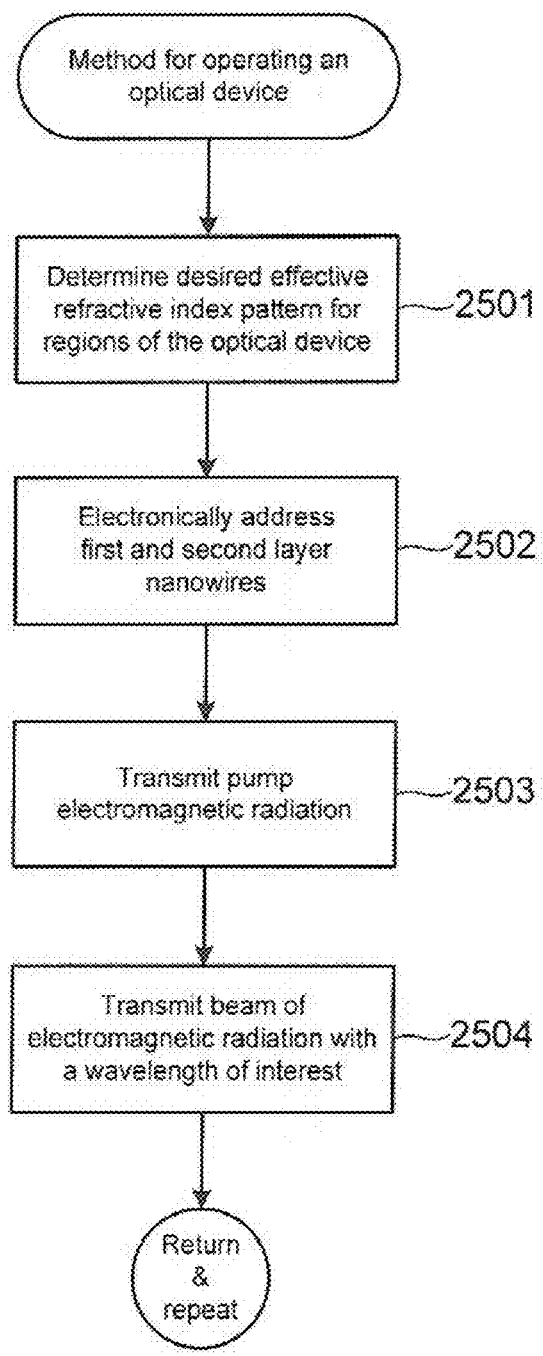
FIG. 25 shows a control-flow diagram of a method for focusing, diverging, or bending an incident beam of electromagnetic radiation with a wavelength of interest.

FIG. 25 shows a control-flow diagram of a method for focusing, diverging, or bending an incident beam of electromagnetic radiation with a wavelength of interest. In step 2501, a pattern of effective refractive indices for the NIM crossbar 1300 is determined for focusing, diverging, or bending the incident beam of electromagnetic radiation, as described above with reference to FIGS. 23-24. In step 2502, appropriate corresponding electronic signals are applied to nanowires in the first and second sets of nanowires, as described above with reference to FIGS. 14 and 17. In step 2503, the NIM crossbar 1300 is flood pumped with pump electromagnetic radiation, as described above with reference to FIGS. 17 and 25. In step 2504, an incident beam of electromagnetic radiation with the wavelength of interest $\lambda$ is transmitted into the NIM crossbar 1300 as described above with reference to FIGS. 14 and 17.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A negative index material crossbar comprising:
a first layer of non-crossing nanowires;
a second layer of non-crossing nanowires, each nanowire in the second layer overlaying the nanowires in the first layer;
resonant elements at intersections of nanowires in the first layer and nanowires in the second layer; and
a gain material incorporated in the crossbar such that transmitted electromagnetic radiation with wavelengths in a wavelength band of interest is enhanced when the crossbar is flood pumped with pump electromagnetic radiation.

2. The negative index material of claim 1 wherein each nanowire in the first layer of nanowires further comprises substantially regularly spaced fingers, and wherein each nanowire in the second layer of nanowires further comprises substantially regularly spaced fingers.

3. The negative index material of claim 2 wherein each of the resonant elements further comprise two fingers of a nanowire in the first layer and two fingers of a nanowire in the second layer.

4. The negative index material of claim 1 wherein the gain material further comprises quantum wires or wires having one or more quantum dots.

5. The negative index material of claim 1 wherein the gain material incorporated in the crossbar further comprises quantum dots disposed within an intermediate layer sandwiched between the first layer of nanowires and second layer of nanowires.

6. The negative index material of claim 1 wherein the gain material incorporated in the crossbar further comprises quantum wells disposed within an intermediate layer sandwiched between the first layer of nanowires and the second layer of nanowires.

7. The negative index material of claim 1 wherein the gain material incorporated in the crossbar further comprises molecules that emit electromagnetic radiation in the wavelength band of interest embedded with a substantially transparent polymer disposed between the first and second layers of nanowires.

8. The negative index material of claim 1 wherein the gain material incorporated in the crossbar further comprises molecules that emit electromagnetic radiation in the wavelength band of interest disposed with opening of the crossbar.

9. The negative index material of claim 1 further comprises a filter that substantially blocks the pump electromagnetic radiation transmitted through the crossbar to the prevent the pump electromagnetic radiation from interfering with the transmitted electromagnetic radiation.

10. The negative index material of claim 1 further comprises a resonator configured to substantially trap the pump electromagnetic radiation and increase interaction of the pump electromagnetic radiation with the gain material.

11. The optical device of claim 1 wherein the crossbar further comprises a negative effective refractive index for the wavelength of interest.

12. A dynamically reconfigurable hologram comprising:
a negative index material crossbar configured in accordance with claim 1 and operated to reproduce a wavefront reflected from an object; and
an intensity-control layer including a two-dimensional array of intensity-control elements, wherein one or more three-dimensional motion pictures can be produced by electronically addressing individual phase-modulation elements of the negative index material crossbar and intensity-control elements in order to reproduce the wavefront and intensity of light associated with one or more holographic images.

13. The hologram of claim 12 wherein electronically addressing the phase-modulation elements further comprises voltages selectively applied to nanowires in the first and second layers associated with each phase-modulation element, such that each voltage changes the refractive index of a phase-modulation element.

14. The hologram of claim 13 wherein changes the refractive index of a phase-modulation pixel further comprises changes the refractive index of resonant elements comprising the phase-modulation element.

15. The hologram of claim 12 wherein electronically addressing the intensity-control pixels further comprises voltages selectively applied to each intensity-control element, each voltage changes the intensity of electromagnetic radiation transmitted through of the intensity-control element.

16. The hologram of claim 12 wherein the intensity-control layer further comprises a liquid crystal layer.

17. A method for focusing, diverging, or bending electromagnetic radiation, the method comprising:
transmitting a beam of electromagnetic radiation having a wavelength of interest through a negative index material crossbar configured in accordance with claim 1;
pumping the negative index material crossbar to emit electromagnetic radiation having substantially the same wavelength of interest to increase the beam of electromagnetic radiation intensity; and
selectively applying electronic signals to nanowires in the first layer of nanowires and the second layer of nanowires, such that the electronic signals establish a pattern of effective refractive indices in regions of the negative index material crossbar, wherein the pattern focuses, diverges, or bends the beam of electromagnetic radiation.

18. The method of claim 17 selectively applying electronic signals to nanowires in the first layer of nanowires and the second layer of nanowires further comprises changing the effective refractive index of the pattern of regions to adjust the focal length of the optical element.

19. The method of claim 17 selectively applying electronic signals to nanowires in the first layer of nanowires and the second layer of nanowires further comprises changing the effective refractive index of the pattern of regions from focusing to diverging the incident beam or from diverging to focusing the incident beam.

20. The method of claim 17 selectively applying electronic signals to nanowires in the first layer of nanowires and the second layer of nanowires further comprises changing the effective refractive index of the pattern of regions from focusing or diverging the incident beam to bending the incident beam or from bending the incident beam to diverging to focusing the incident beam.

* * * * *

UNITED STATES PATENT AND TRADEMARK OFFICE
CERTIFICATE OF CORRECTION

PATENT NO.        : 8,134,774 B2
APPLICATION NO.   : 12/386295
DATED             : March 13, 2012
INVENTOR(S)       : Shih-Yuan Wang et al.

It is certified that error appears in the above-identified patent and that said Letters Patent is hereby corrected as shown below:

In column 24, line 16, in Claim 9, before "prevent" delete "the".

In column 24, line 52, in Claim 15, after "through" delete "of".

Signed and Sealed this
Eighth Day of January, 2013

David J. Kappos
*Director of the United States Patent and Trademark Office*